(12) United States Patent
Wang et al.

(10) Patent No.: US 10,762,195 B2
(45) Date of Patent: *Sep. 1, 2020

(54) PROTECTION AND COMMUNICATION ABSTRACTIONS FOR WEB BROWSERS

(71) Applicant: Microsoft Technology Licensing, LLC, Redmond, WA (US)

(72) Inventors: Helen J. Wang, Issaquah, WA (US); Xiaofeng Fan, Redmond, WA (US); Collin Edward Jackson, Seattle, WA (US); Jonathan Ryan Howell, Seattle, WA (US); Zhenbin Xu, Sammamish, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,382

(22) Filed: Jun. 9, 2018

(65) Prior Publication Data

US 2018/0293375 A1 Oct. 11, 2018

Related U.S. Application Data

(63) Continuation of application No. 11/762,900, filed on Jun. 14, 2007, now Pat. No. 10,019,570.

(51) Int. Cl.
*G06F 21/53* (2013.01)
*G06F 9/455* (2018.01)
*H04L 29/06* (2006.01)

(52) U.S. Cl.
CPC .... *G06F 21/53* (2013.01); *G06F 2009/45587* (2013.01); *G06F 2221/2119* (2013.01); *H04L 63/1441* (2013.01)

(58) Field of Classification Search
CPC .......... G06F 21/53; G06F 2009/45587; G06F 2221/2119; H04L 63/1441
See application file for complete search history.

(56) References Cited

U.S. PATENT DOCUMENTS 6,049,812 A * 4/2000 Bertram ................ H04L 29/06
715/205
6,757,868 B1 * 6/2004 Glaser .................. G06F 16/951
715/207

(Continued)

OTHER PUBLICATIONS

Rosenberg, "Controlling Access to the Internet: The Role of Filtering", Mar. 2001, pp. 1-30.*

*Primary Examiner* — Doon Y Chow
*Assistant Examiner* — Phuong N Hoang
(74) *Attorney, Agent, or Firm* — Ranjeev Singh; Singh Law, PLLC

(57) ABSTRACT

Systems and methodologies for accessing resources associated with a Web-based application in accordance with one or more embodiments disclosed herein may include a browser that obtains at least first resources from a first domain and second resources from a second domain and a resource management component that facilitates controlled communication between the first resources and the second resources and prevents the first resources and the second resources from accessing other resources that the first resources and the second resources are not permitted to access. The resource management component may be further operable to contain restricted services in a sandbox containment structure and/or to isolate access-controlled resources in a service instance. In addition, the resource management component may be operable to facilitate the flexible display of resources from disparate domains and/or controlled communication therebetween.

20 Claims, 16 Drawing Sheets

(56) References Cited

U.S. PATENT DOCUMENTS

| | | | | |
|---|---|---|---|---|
| 6,917,963 | B1* | 7/2005 | Hipp | G06F 9/44505 709/204 |
| 2002/0019941 | A1* | 2/2002 | Chan | G06F 21/53 713/185 |
| 2004/0006706 | A1* | 1/2004 | Erlingsson | G06F 21/51 726/30 |
| 2006/0010241 | A1* | 1/2006 | Kudallur | G06F 21/562 709/229 |
| 2008/0072224 | A1* | 3/2008 | Check | G06F 9/5077 718/1 |
| 2015/0047030 | A1* | 2/2015 | Erlingsson | G06F 21/51 726/22 |

* cited by examiner

PROTECTION AND COMMUNICATION ABSTRACTIONS FOR WEB BROWSERS

This application is a continuation of U.S. application Ser. No. 11/762,900, entitled "Protection and Communication Abstractions for Web Browsers" filed on Jun. 14, 2007, the disclosure of which is incorporated herein in its entirety by reference.

TECHNICAL FIELD

The subject invention relates generally to Web browsers, and more particularly to techniques and mechanisms for enhanced security and communication implementable by Web browsers for supporting Web applications.

BACKGROUND OF THE INVENTION

Web browsers are increasingly becoming a single-stop resource for computing needs including information access, personal communications, office tasks, and e-commerce. Conventional Web applications synthesize the world of data and code, offering rich services through Web browsers and rivaling those of desktop PCs. Web browsers have evolved from a single-principal platform on which users browse one site at a time into a multi-principal platform on which data and code from mutually distrusting sites interact programmatically in a single page on the client side, enabling feature-rich "Web 2.0" applications (or "mashups") that offer close-to-desktop experiences. These applications also resemble the PC operating environment, where mutually distrusting users share host resources.

However, unlike PCs, which utilize multi-user operating systems for resource sharing, protection, and management, conventional browsers provide a limited binary trust model and protection mechanisms suitable only for a single-principal system. In particular, conventional browsers can typically only offer either no trust across principals through complete isolation or full trust through incorporating third party code as libraries. Consequently, Web programmers are forced to make tradeoffs between security and functionality, and often times must sacrifice security for functionality.

Accordingly, there exists a need in the art for protection and communication mechanisms that can enhance the security of a browser without an undue sacrifice in functionality.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methodologies in accordance with various embodiments disclosed herein can mitigate the above-noted deficiencies to enable robust and secure Web applications on a rich multi-principal platform. By drawing an analogy between the sharing of browser resources by Web sites and the sharing of operating system resources by users, protection and communication abstractions for Web browsers can be developed in accordance with various aspects described herein. The goal of protection is to prevent one principal from compromising the confidentiality and integrity of other principals, while communication allows them to interact in a controlled manner. In accordance with one aspect, these abstractions can be designed to match all of the common trust levels between Web service providers and integrators, to strike a balance between ease of use for programming and security, and to allow easy adoption by including fallback mechanisms and avoiding unintended behavior in legacy browsers.

In accordance with one aspect, restricted services can be employed by content providers as a fundamental addition to conventional Web service provisioning. For example, a content provider may identify a service as restricted if the provider does not trust the service to access other private content from the provider's domain. An example of a restricted service may be user profiles on a social networking site. A content provider may also host restricted services differently from public services such that no client browser will regard the services as publicly available. This may be done, for example, by specifying the restricted nature of the service using the MIME protocol with a MIME content subtype data for the service.

In accordance with another aspect, a browser abstraction may facilitate an asymmetric level of trust between a content provider and a content integrator when restricted content or untrusted public library content is to be utilized by the integrator. This abstraction may be implemented, for example, through a <Sandbox> HTML tag and corresponding resource containment functionality implemented for a client Web browser. In one example, the <Sandbox> HTML tag and corresponding browser abstraction and functionality may be utilized to enclose untrusted user input for a web service, thereby facilitating the prevention of cross-site scripting (XSS) attacks on a Web-based application.

In accordance with yet another aspect, a browser abstraction may facilitate resource management and isolation for access-controlled content. This abstraction may be implemented, for example, through a <ServiceInstance> HTML tag and corresponding resource control functionality implemented for a client Web browser. In one example, resources managed and/or isolated using the <ServiceInstance> HTML tag and corresponding browser abstraction may communicate with one another in a controlled manner using an additional browser abstraction and a corresponding CommRequest object. In another example, access-controlled content may be flexibly displayed at a client Web browser using another additional browser abstraction and a corresponding <Friv> HTML tag In accordance with still another aspect, a client Web browser may be extended by employing a script engine proxy in connection with the Web browser. The script engine proxy can interpose between the rendering engine of the browser and the script engine of the browser for customization for Document Object Model (DOM) object manipulation.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
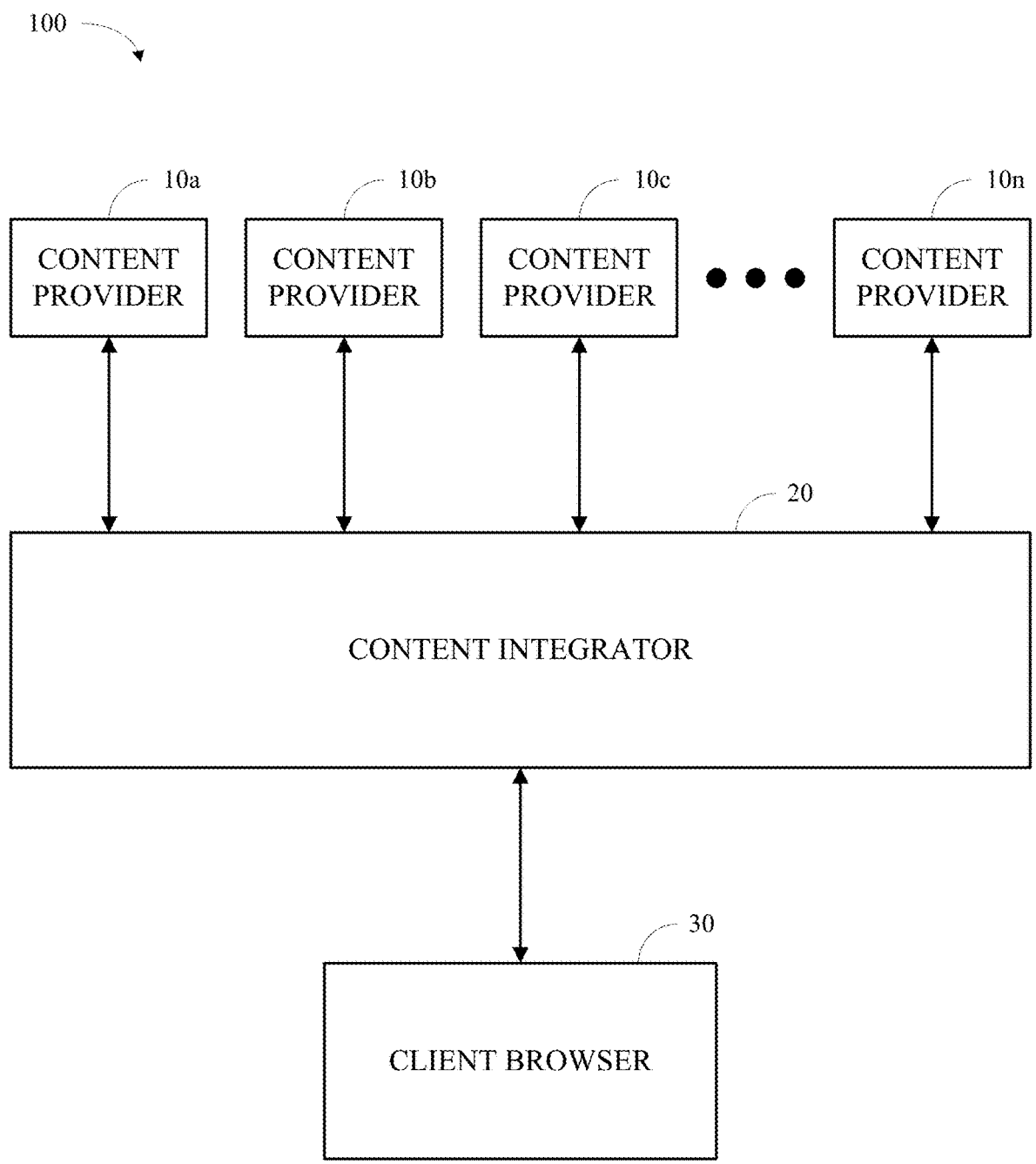
FIG. 1 is a block diagram of a system that provides Web-based application functionality.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "algorithm," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. The components may communicate via local and/or remote processes such as in accordance with a signal having one or more data packets (e.g., data from one component interacting with another component in a local system, distributed system, and/or across a network such as the Internet with other systems via the signal).

Thus, the embodiments disclosed herein, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Referring now to the drawings, FIG. 1 illustrates a block diagram of a system 100 that provides Web-based application functionality. In accordance with one aspect, a Web-based application may be provided by a content integrator 20, which may communicate with one or more third-party content providers 10 to integrate content and/or services from the content providers 10 for the application. A user can then access the Web-based application via a client Web browser 30 by accessing and communicating with the content integrator 20.

In general, the Web has evolved from a collection of static documents connected by hyperlinks, Dynamic HTML, scripts such as JavaScript, etc., into a dynamic, rich, interactive experience driven by client-side code executed by browsers 30 and aggregation by Web services provided by content integrators 20. However, security policies of conventional browsers are still designed primarily for the older style of Web browsing on static, single-principal sites, as opposed to the newly-evolved style of client mashups, where distrusting sites can interact programmatically on a single Web page.

Same-Origin Policy

As Web pages have become more dynamic, browsers have introduced cookies as a way to differentiate users and to operate in a way that depends on the user. Cookies add state to the otherwise stateless HTTP protocol, giving the user the illusion of isolated, continuous connections to remote sites. Cookies are small, arbitrary pieces of data chosen by the Web server and sent to the browser when responding to a request. They are returned to the server that sent them by the browser on subsequent requests. Web applications built around cookies rely on the browser to keep their sessions isolated from other sites; if an attacker can make requests with the cookie of a logged-in victim, the attacker becomes indistinguishable from the victim. This security policy, enforced by the browser, is known as the Same-Origin Policy (SOP). Under the SOP, only the site that sends some information to the browser may later read or modify that information.

JavaScript, a more recent browser feature, allows code from one page or frame to read and modify other pages or frames using the Document Object Model (DOM), an interface that allows script to read and modify the content, structure, and style of HTML documents. These types of accesses across domain boundaries could allow an attacker to misuse a cookie from a user or even read pages behind corporate firewalls that would not be directly accessible by the author of a script. To prevent these attacks and maintain isolation, the SOP was applied to JavaScript, using a definition of "site" based on the scheme (i.e., http or https), DNS name, and TCP port of the URL. For example, frames from a first Web site and a second Web site are isolated from each other and cannot access resources of the other. The XMLHttpRequest method of data communication, which allows JavaScript to download XML files from its origin server and has become the ubiquitous tool of asynchronous JavaScript and XML ("AJAX") applications, is constrained by the SOP as well. For example, a frame from a first Web site cannot issue an XMLHttpRequest to a second Web site.

Binary Trust Model

Web developers often wish to incorporate code from third-party sources. JavaScript files rarely contain sensitive information behind firewalls and are usually not access-controlled by cookies, so browsers implicitly assume that files in this format are public code libraries and allow them to be executed across domains, bypassing the SOP. The code runs as a library, with the privileges of the page including it. For example, the page http://a.com/service.html may contain the markup <script src='http://b.com/lib.js'>, which allows lib.js to access HTML DOM objects, cookies and data from a.com through XMLHttpRequest. However, lib.js cannot access resources from b.com since lib.js is associated with a.com but not b.com in this context. This powerful but dangerous workaround to the ordinary isolation policy of the SOP manifests a binary trust model: a site either completely distrusts another site and is segregated through the use of cross-domain frames, or a site can use another site's code as its own, offering full resource access to the remote site.

Web Mashups

Web mashups are defined as Web sites that compose data from more than one site. However, this definition is in tension with the same-origin policy, which prevents such communication. Many data providers want to publish information for any integrator site 20 to use, but the same-origin policy prevents an XMLHttpRequest made by a browser 30 from loading the data directly. Initially, mashup developers worked around these restrictions using a proxy approach, by taking information from a third party and making it appear to the browser 30 to be "same-origin." However, a drawback of this approach is that the content makes several unnecessary round trips, reducing performance. Further, the proxy can become a choke point, limiting scalability. Alternatively, by encoding public data in executable JavaScript format (e.g., JavaScript Object Notation or "JSON"), cross-domain script tags can also be used to pass data from a provider 10 to an integrator 20 across domain boundaries, eliminating the need for proxies. However, this technique has the unfortunate side effect of granting the privileges of the integrator 20 to a provider 10. As a result, the binary trust model of the SOP forces the integrator 20 to make tradeoffs between security and functionality.

Gadget Aggregators

Web gadget aggregators are an advanced form of mashup, combining user-selected active content from third-party sources into a single portal page. A gadget is an HTML-plus-JavaScript component designed to be included into a gadget aggregator page; it is the client side of some Web service. Gadget aggregators are security-conscious; they host each untrusted gadget in a frame on a distinct (sub) domain, relying on the SOP to isolate third-party gadgets from one another and from the outer page. However, because the SOP prevents interoperation among gadgets, aggregators also support inline gadgets, which include third-party code as a library of the aggregator page using the script tag. The binary trust model of conventional browsers 30 unfortunately forces the gadget aggregator to decide between interoperation and isolation. Because inlining requires complete trust, some aggregators ultimately pass the security problem to a user by asking the user whether he trusts the author of an inline module.

Next-Generation Communication Proposals

Frustrated by the limitations of the SOP, mashup developers have expressed a need for a new security policy for the Web, allowing fine-grained policy decision making between communicating domains. Web service providers desire the ability to make their own access control decisions as to whether data they send between domains is public, whether it should be executed, or whether it should be ignored, rather than relying on a browser to make this decision. Several new browser communication proposals have emerged, governed not by the SOP, but rather by a new type of policy called the verifiable-origin policy (VOP). Under the VOP, a site may request information from any other site, and the responder can check the origin of the request to decide how to respond.

Figure 2:
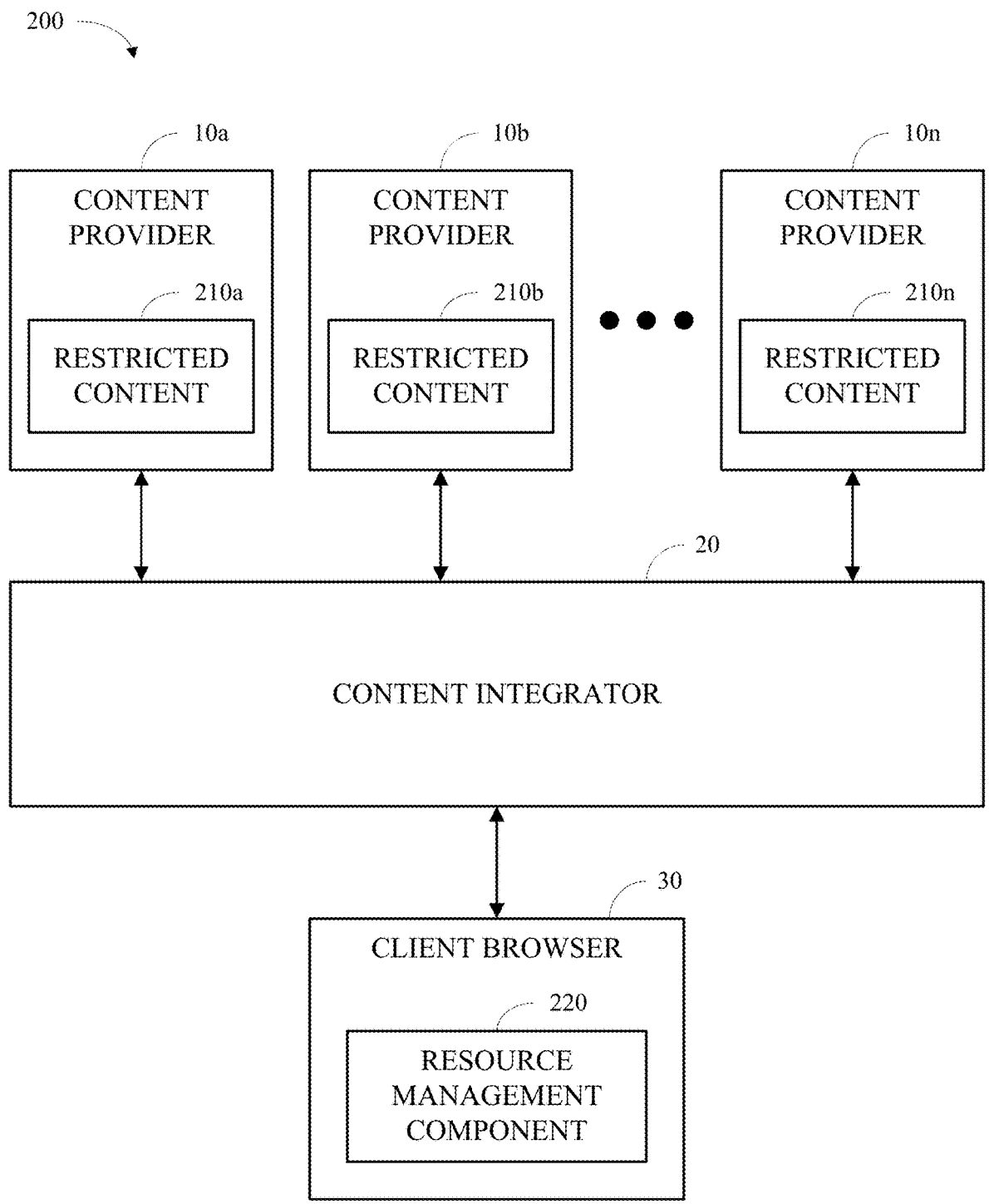
FIG. 2 is a block diagram of a system that facilitates enhanced security and communication capability for Web-based applications in accordance with an aspect of the present invention.

Referring now to FIG. 2, a block diagram of a system 200 that facilitates enhanced security and communication capability for Web-based applications in accordance with an aspect of the present invention is illustrated. By way of specific, non-limiting example, system 200 may be utilized in connection with a browser-based multi-principal operating system. Like system 100 in FIG. 1, system 200 may provide Web-based application functionality via a content integrator that receives resources from one or more third-party content providers 10. The content integrator 20 may then communicate with a client Web browser 30 to provide the Web-based application functionality to a user. In accordance with one aspect, system 200 mitigates the problems associated with security and functionality of Web-based applications noted with regard to system 100 above by employing a resource management component 220 at client browser 30. In one example, resource management component 220 is operable to implement one or more browser abstractions for increased security and enhanced communication between the client browser 30 and a Web-based application at the content integrator 20. In another example, the resource management component 220 at the client browser 30 may additionally include mechanisms for enforcing constraints on the reach of restricted content 210 at third-party content providers 10, which may in turn be utilized by the content integrator 20 in a Web-based application.

Principals and Resources

In accordance with one aspect, Web applications can be viewed in the context of the conventional notion of the multi-user operating system ("OS"), in which different principals have access to different sets of resources. In the OS environment, the principal is a user or group. By associating a process with a principal, the OS ensures that the process only has as much power as the principal that controls the process' behavior. In general, one user does not trust another with respect to the confidentiality and integrity of her resources. In the Web environment, the principal is the owner of some Web content. In practice, browser adherence to the SOP means that the real notion of Web principal is tied to ownership of a DNS domain.

Traditionally, the original cookie specification allowed a page to restrict a cookie to only be sent to its server on subsequent requests if those requests were for pages starting with a particular path prefix. This access control policy does not match the trust hierarchy of most Web server deployments, since the owner of the root of a Web server ultimately controls all the subpaths, while the subpaths may contain less trustworthy, third-party content. With the advent of the SOP, the use of path-restricted cookies became a moot way to protect one page from another on the same server, since same-domain pages can directly access the other pages and pry their cookies loose.

Alternatively, applications may be allowed to identify themselves using more of the URL than the SOP domain tuple; unlike the original cookie path hierarchy, this approach reflects the fact that the root of a Web server dominates its subpaths. The motivation for this alternative is the common Web practice of delegating ownership of Web server content by pathname, such as the ubiquitous /~user/ user home directory scheme used on departmental Web servers. Unfortunately, this scheme fails for the same practical reason as cookie paths: providing legacy support for the SOP's coarser notion of principal destroys the distinction between path-based fine-grained principals. The practical consequence of the ubiquity of SOP-domain-based principals is that Web servers that wish to provide fine-grained separation of principals must do so using DNS subdomains rather than subpaths.

Because of the difficulty with escaping the SOP legacy, various aspects described herein preserve the idea of using the SOP domain (<scheme, DNS host, TCP port> tuple) as the principal. Thus, the terms "domain" and "principal" are used interchangeably herein.

Browsers may also provide to applications various resources. For example, browsers may provide memory to an application, which may correspond to the heap of script objects including HTML DOM objects that control the display. This is analogous to process heap memory. In addition, browsers may also provide applications with the ability to store cookies or some other persistent state, which persist across application invocations. This resource is weakly analogous to the OS file system. Further, browsers may provide the ability to send and receive messages outside the application, equivalent to an OS network facility.

Trust Model Among Principals

In accordance with one aspect, the resource management component 220 implements abstractions that match common trust levels of Web programmers in their service creation, whether as a service provider providing a Web service or component or as a service integrator integrating or composing others' services into a mashup. In contrast, conventional browsers offer abstractions for only a binary trust model, which is insufficient for today's Web services.

Services Offered by Providers

Service providers have expressed a need to segregate the data and code that they serve into three categories. The first such category is private, sensitive content, which must be access-controlled by the service provider through a well-defined service API. For example, for a Web mail provider, a user's mailbox and contact list are sensitive information; access to that information must be authenticated and authorized through a service API given by the Web mail provider. Services that control access to the private, sensitive data and code of a provider are herein referred to as access-controlled services. The second category is public content, which can be freely used by anyone. For example, a map provider may give away a code library for anyone to use for accessing its public map data. Such services are herein referred to as library services.

The third of said categories is restricted content 210. In accordance with one aspect, restricted content 210 may be third-party content hosted by a provider 10 that is not trusted to access other private content from the domain of the provider 10. Conventionally, there has been no distinction between restricted content 210 and public content from the same domain. For example, a user profile hosted by a social networking Web site in the same domain is conventionally treated as public content. There is no way for the provider to indicate the untrustworthiness of such content and that browsers should deny such content's access to any domain's resources unless explicitly allowed. This deficiency has led to vulnerable Web services that suffer from devastating attacks like Cross Site Scripting (XSS) attacks. In one example, when restricted content 210 is hosted privately and access-controlled by a provider 10, it becomes an access-controlled service as noted above.

For the security of its site, a provider 10 must ensure that no matter how library services and restricted services may be used (or abused) by an integrator 20, it will not violate the access control of the provider's access-controlled services. For example, a provider 10 that offers both an access-controlled mail service and a public map library service must ensure that its map library code or any other third party restricted content 210 has no access to any of its users' mailbox and contact lists.

Restricted Services and their Usage

In accordance with one aspect, service providers 10 are enabled to offer restricted content 210 and restricted services that host third-party services or components and to enforce the restricted use of them. Allowing differentiation between restricted content 210 and public content has significant security benefits.

Restrictions for Restricted Services

In one example, restricted services can contain any HTML or media content. However, they may not be allowed to have direct access to any principals' resources including their HTML DOM objects, cookies, nor to any principals' remote data store at their backend Web server through XMLHttpRequest. It should be appreciated that this is a one-way restriction that constrains restricted services from their integrators. The other direction of the restriction is at the discretion of integrators. Further, restricted services are allowed to communicate using controlled communication abstractions for both cross-domain browser-to-server communication and cross-domain browser-side communication. The origins of restricted services in such communications are marked as restricted, and the protocol requires participating Web servers to authorize the requester before providing service. Because the requester is anonymous, no participating server will provide any service that it would not otherwise provide publicly.

Hosting Restricted Services

In one example, a content provider 10 or service provider is required to host restricted content 210, say "restricted.r", differently from other public HTML content so that no browsers 30 will render "restricted.r" as a public HTML page. Otherwise, "restricted.r" could be maliciously loaded into a browser window or frame (e.g., a frame named "uframe") without the constraints that are intended for restricted services. The supposedly restricted service in "uframe" would have the same principal as the provider's web site and access the provider's resources. This violates the semantics of restricted services and can be exploited by attackers for phishing. To prevent this, the MIME protocol may be employed. In one example, providers 10 of restricted services and/or restricted content 210 are required to indicate their MIME content subtype to be prefixed with x-restricted+. For example, text/html content may be required to be labeled text/x-restricted+html.

Trust Relationship Between Providers and Integrators

The trust relationship between an integrator 20 and a provider 10 at separate domains is summarized in Table I as follows:

TABLE 1

Trust relationship between a content provider and a content integrator.

| | | Provider | | |
|---|---|---|---|---|
| | | Library Service (Full access to public content) | Access-controlled service (Controlled access to private content) | Restricted service (Full access to restricted content) |
| Integrator | Full access | 1. Full trust | 3. Controlled trust | 5. Asymmetric trust |
| | Controlled access | 2. Asymmetric trust | 4. Controlled trust | 6. Asymmetric trust |

The integrator 20 may either trust the provider 10 to fully access the resources of the integrator 20, or not trust the provider 10 and export an access control service API for the provider 10 to access the resources of the integrator 20. This corresponds to the two rows in Table I labeled "Full access" and "Controlled access." It should be appreciated that Table 1 does not show how the integrator 20 may control its own access to the provider 10, as in this scenario the integrator 20 would serve as its own provider proxying the provider's services.

When the provider 10 offers a library service, if the integrator 20 allows "full access," then the integrator 20 uses the library as its own code accessing the integrator's resources, such as its HTML DOM objects, cookies, and obtaining remote data from the integrator's Web server through XMLHttpRequest. This manifests a full trust between the integrator 20 and the library service of the provider 10, as shown in Cell 1 in Table 1. If the integrator 20 offers "controlled access," then this manifests an asymmetric trust, as illustrated in Cell 2, where the integrator 20 can access the library freely, but the library must use the integrator's access control service API to access the integrator's resources. When the provider 10 offers an access-controlled service, if the integrator 20 offers "full access," then the provider's access control API dictates the resource access on both the provider 10 and the integrator 20. This manifests a controlled trust where the provider 10 trusts the integrator 20 to the extent allowed by the provider's access control policy for the integrator 20. This corresponds to Cell 3 in Table 1. If the integrator 20 instead offers "controlled access," the exchange of information between the integrator 20 and the provider 10 goes through two access control service APIs. This manifests bi-directional controlled trust, as shown in Cell 4. If an abstraction is provided for the scenario of a single-direction controlled trust, then the bi-directional scenario simply requires two uses of the abstraction, one for each direction. When the provider 10 offers a restricted service and/or restricted content 210, browsers 30 should force the integrator 20 to have at least asymmetric trust with the service regardless of how trusting the consumers are, as shown in Cells 5 and 6.

Conventional browsers only have abstractions for two trust levels: no trust through the use of a cross-domain frame and full trust through script inclusion (Section II). It should be appreciated that no trust is just one configuration of controlled trust. In contrast, the resource management component 220 at client browser 30 provides abstractions for all trust levels described in Table 1. In addition, the abstractions provided by the resource management component 220 may be backward compatible, allowing Web programmers to supply alternative content for browsers that do not support the abstractions provided by the resource management component 220. As a result, web programmers can adopt the provided abstractions with ease and comfort.

Figure 3:
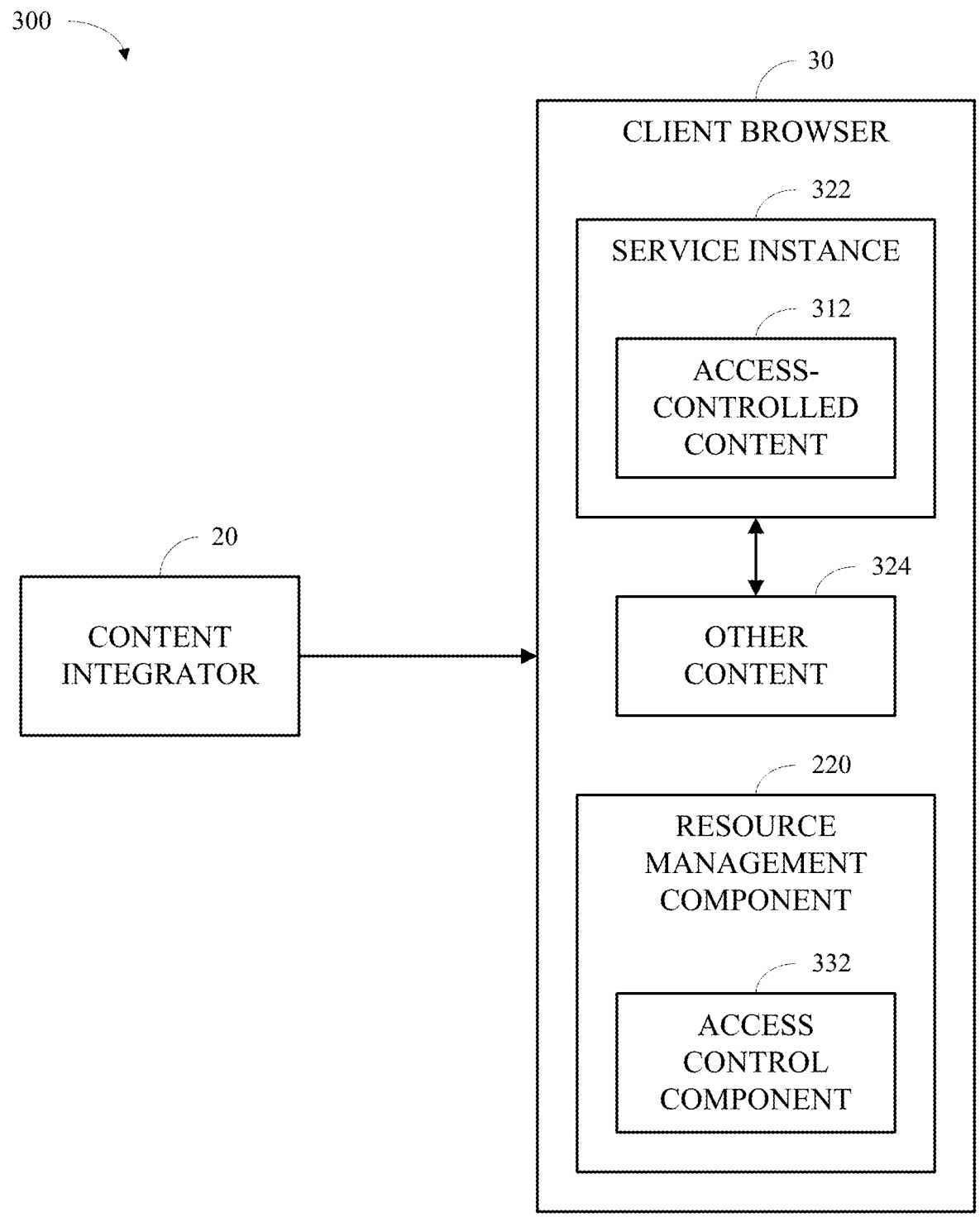
FIG. 3 is a block diagram of a system that facilitates controlled communication with access-controlled content in a Web-based application in accordance with an aspect of the present invention.

Turning now to FIG. 3, a block diagram of a system 300 that facilitates controlled communication with access-controlled content 312 in a Web-based application in accordance with an aspect of the present invention is illustrated. As illustrated in system 300, a client browser 30 may obtain one or more types of content from a content integrator 20 in order to carry out a Web-based application. In one example, the client browser 30 can include a resource management component 220 that can facilitate enhanced security and communication capability by the client browser 30 in a similar manner to the resource management component 220 described above with regard to system 200. The content provided by the content integrator 20 may in turn be obtained from one or more content providers (e.g., content providers 10). In one example, the content received by the client browser 30 can include access-controlled content 312. To facilitate enhanced protection and controlled communication between the access-controlled content 312 and other content 324 obtained from the content integrator 20, the resource management component 220 at the client browser 30 can include a access control component 332 that can implement mechanisms and/or browser abstractions for isolating the access-controlled content 312 in a structure such as a service instance 322.

Problems with Conventional Browsers

Conventional mainstream browsers have no mechanism for controlled cross-domain communication. The only cross-domain communication primitive available is the <script> tag, which gives a service provider (e.g., a content provider 10) uncontrolled access to the domain of the integrator 20. Techniques for cross-domain communication have been proposed, but they are not widely adopted. Further, each implementation of such proposals exists in isolation, so none provides a general solution to the problem of mismatched trust patterns. As a result of the lack of controlled cross-domain communication, there is also no way for a parent window and a child window, containing mutually untrusted content, to flexibly negotiate the layout of the boundary between them. Browser <frame>s offer isolation at the cost of rigid, parent-controlled layout, and <div>s offer flexible, content-sensitive layout at the cost of requiring full trust between parent and child content. Finally, the only protection abstraction in conventional browsers is the SOP boundary. Unlike an OS process, a single principal cannot instantiate this abstraction multiple times to provide fault containment among multiple applications.

Isolation and Fault Containment: ServiceInstance

To solve these problems, the access control component 332 at client browser 30 can utilize the ServiceInstance abstraction, which enables an application or component from one domain to integrate a component from another domain, isolating the components while enabling controlled communication between them. This abstraction realizes the controlled trust scenario as noted above in Table 1. An application may instantiate a service instance 322 with the following tag:

<ServiceInstance       src="http://alice.com/app.html" id="aliceApp">

The tag creates an isolated environment, analogous to an OS process, fetches into it the content from the specified src, and associates it with the domain alice.com that served that content.

In accordance with one aspect, a service instance 322 may protect memory, persistent state, and display resources as follows. To protect memory, each service instance 322 may have its own isolated region of memory. Thus, no service instance 322 can follow a JavaScript object reference to an object inside another service instance 322. This is true even for service instances 322 associated with the same domain, just as multiple OS processes can belong to the same user. Thus, one domain can use service instances 322 to provide fault containment among multiple application instances. To protect persistent state, cookies may be handled no differently in client browser 30 than in conventional browsers—two service instances 322 can access the same cookie data if and only if they belong to the same domain, just as two processes can access the same files if they are running as the same user. To protect display, a raw service instance 322 may come with no display resource. Instead, a parent service instance 322 may be required to allocate a subregion of its own display, which may be referred to as a Friv, and assign the Friv to the child service instance 322. The parent may use Friv to assign multiple regions of its display to the same child service instance 322, just as a single process can control multiple windows in a desktop GUI framework, such as a document window, a palette, and a menu pop-up window.

Flexible Cross-Domain Display: Friv

In accordance with one aspect, a Friv is a flexible cross-domain display abstraction for service instances 322. A Friv behaves like a conventional iframe in that it enables content to use part of its container's display while otherwise isolating their resources. However, the iframe is difficult to use in tightly-integrated applications because the parent specifies the iframe's size regardless of the contents of the iframe. Web developers instead prefer the div tag—because its contents and its container share a domain, the browser layout engine can resize the div's display region to accommodate its contents. In one example, the following tag syntax may create a new Friv and assign it to an existing service instance 322:

<Friv width=400 height=150 instance="aliceApp">

Alternatively, this syntax may create a new service instance 322 and a new Friv simultaneously and assign the latter to the former:

<Friv width=400 height=150 src="http://alice.com/page.html">

The Friv is so named because it crosses the iframe and the div. It isolates the content within, but it includes default handlers that negotiate layout size across the isolation boundary using local communication primitives. These handlers give the Friv convenient div-like layout behavior.

Service Instance and Friv Life Cycle—

The life cycle of a service instance 322 is limited, by default, by the service instance's responsibility for some part of the display of the browser 30. A service instance 322 can track the display regions that it owns by registering a pair of handlers with the following methods:

ServiceInstance.attachEvent(func, 'onFrivAttached');
    ServiceInstance.attachEvent(func, 'onFrivDetached');

The first callback can be invoked whenever the parent assigns a new Friv display to the service instance 322. When the parent reclaims the display associated with a Friv (e.g., by removing the Friv element from its DOM tree), the Friv's DOM disappears from the child service instance's object space, and the child's onFrivDetached handler is called. The default onFrivAttached and onFrivDetached handlers track the set of Frivs. When the last Friv disappears, the service instance 322 no longer has a presence on the display, so the default handler invokes ServiceInstance.exit( )

to destroy the service instance 322.

A service instance 322 can act as a daemon by overriding the default handlers so that it continues to run even when it has no Frivs. Such a service instance 322 may continue to communicate with remote servers and local client-side components, and has access to its persistent state.

When a Friv is assigned to a new location (for example, using document.location=url, or equivalently, when the user clicks on a simple link in the Friv's DOM), the Friv's fate depends on the domain of the new location. At least two possibilities for the Friv's fate exist. First, if the domain is different from that of the service instance 322 that presently owns the Friv, the behavior is just as if the parent had deleted the Friv (e.g., by detaching it from the existing service instance 322) and created a new Friv and service instance 322 with the <Friv src= . . . > tag. The only resource carried from the old domain to the new is the allocation of display real-estate assigned to the Friv. This behavior is analogous to creating a new process with a new identity, giving it the handle of the existing X Window region, and disconnecting the prior process from the same X Window. Second, if the domain matches that of the service instance 322 that owns the Friv, then the HTML content at the new location simply replaces the Friv's layout DOM tree, which remains attached to the existing service instance 322. Any scripts associated with the new content are executed in the context of the existing service instance 322.

Browsers 30 may also allow a Web application to create a new "popup" window. The creation of a popup may create a new parentless Friv associated with the service instance 322 that created the popup.

In accordance with one aspect, the legacy <Frame> tag may be implemented with service instances 322 and Frivs as follows. For each domain, there may be a special "legacy"

service instance 322, where the <Frame src=x> tag is an alias for <Friv src=x instance=legacy>. Thus, all frame content and scripts for a single domain appear in a common object space, just as they do in legacy SOP-only browsers. Within the legacy service instance 322, each script still has a local document reference that identifies the Friv with whose DOM the script was loaded, so that references like document.location are meaningful.

Figure 4A:
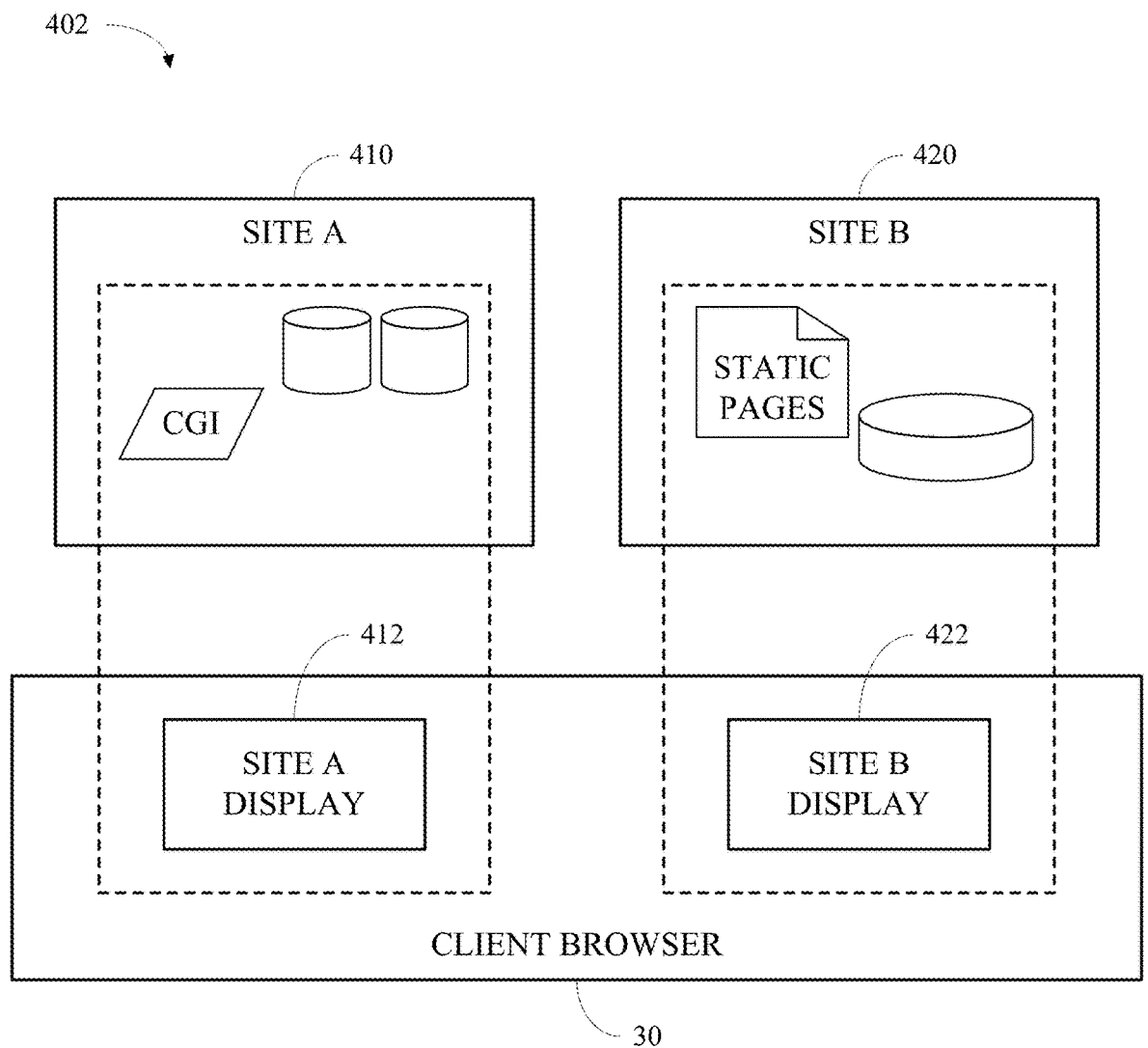
FIG. 4A illustrates communication between a client Web browser and multiple content providers in a conventional Web-based application.
Figure 4B:
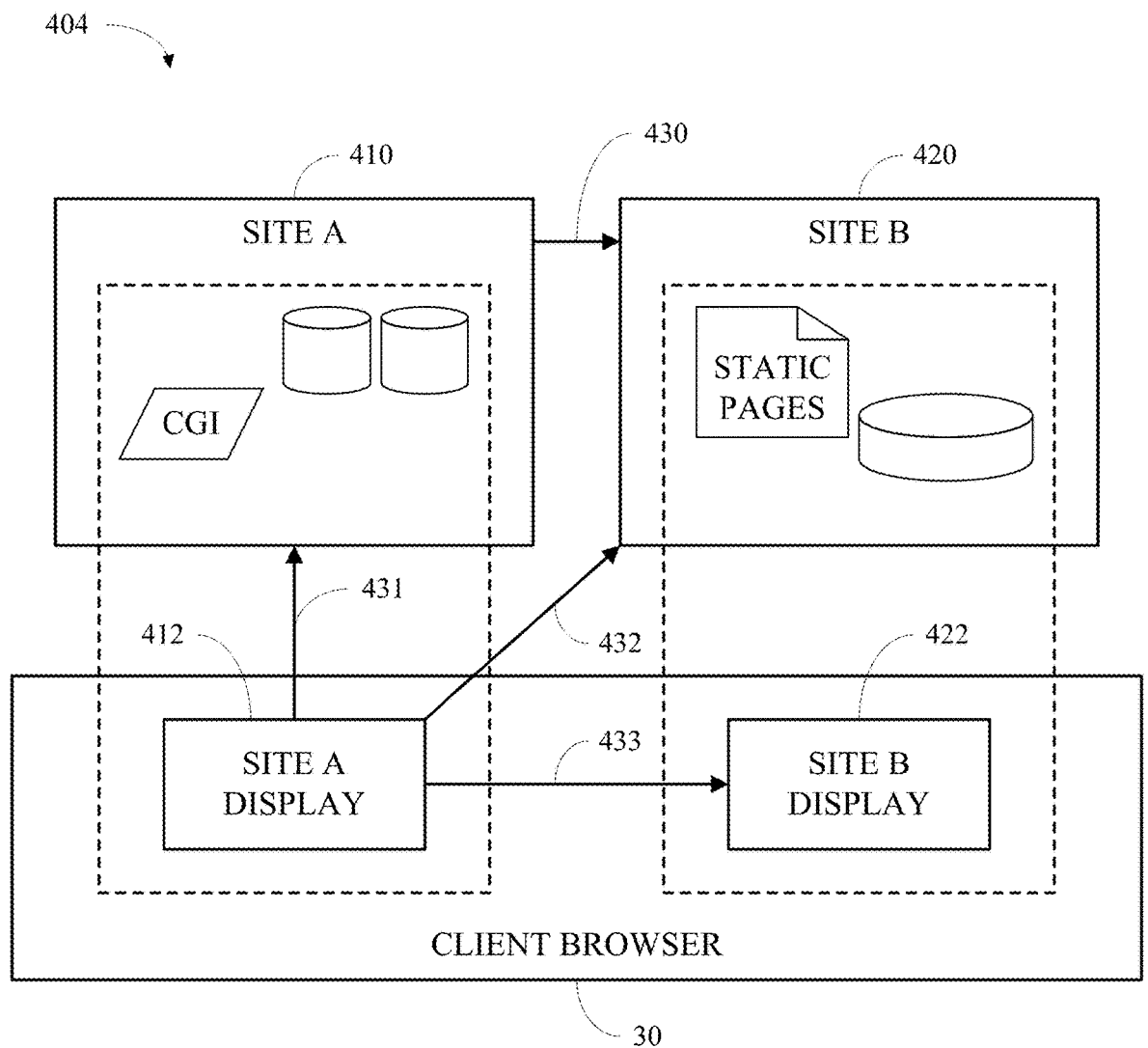
FIG. 4B illustrates communication between a client Web browser and multiple content providers in a Web-based application that employs enhanced communication abstractions in accordance with an aspect of the present invention.

Referring to FIGS. 4A and 4B, diagrams 402 and 404 are provided that illustrate communication between a client Web browser (e.g., a browser 30) and a Web-based application (e.g., an application provided by an integrator 20). As shown in FIG. 4A, a Web application can be seen as the pairing of browser-side components and server-side components, all owned by a common domain. More particularly, diagram 402 illustrates a client browser 30 utilizing a Web application that includes content from two Web sites, denoted as Site A 410 and Site B 420. The browser 30 can display content 412 from Site A and content 422 from Site B. However, if browser 30 is a legacy browser that is not capable of the browser abstractions disclosed herein, the browser 30 will be limited by the SOP in that they enable only communication from the browser-side component to its corresponding server.

This communication is again illustrated in diagram 404 at FIG. 4B, where it is illustrated by arrow 431. Servers, however, frequently communicate with other servers in other domains by establishing a new TCP connection (arrow 430). The recipient server establishes a port on which it listens for the connection, and with each connection the recipient learns the identity of the sender (e.g., its IP address, roughly equivalent to its SOP domain). In accordance with one aspect, a CommRequest abstraction may be provided to follow the VOP, extending this facility to browser-side components by providing two additional communications paths: cross-domain browser-to-server communication and cross-domain browser-side communication.

1) Browser-to-Server Communication—

As noted above, the SOP protects legacy servers (e.g., those behind corporate firewalls) by confining browser-to-server communication to stay within the same SOP domain. It can be observed, however, that cross-domain browser-to-server communication (arrow 432) can be safely allowed, so long as the proposed protocol labels the request with the domain that initiated it, and ensures that any participating server understands that it must verify the domain initiating the request. In particular, any VOP-governed protocol must fail with legacy servers. In contrast, in accordance with one aspect, servers may be required to indicate their compliance by implementing a VOP communication mechanism such as JSONRequest and tagging their replies with a special MIME content type, e.g., (application/jsonrequest). The JSONRequest protocol allows the transmission of data in JSON format, which is a data-only subset of JavaScript. Under the JSONRequest mechanism, a request to a server is required to include a header indicating the source of the request, and a reply to the request is required to indicate the server is aware of the protocol and its security implications. In addition, the JSONRequest protocol disallows the automatic inclusion of cookies with request transmission to avoid a variety of subtle vulnerabilities. In one example, CommRequests can similarly prohibit automatic inclusion of cookies with requests.

2) Browser-Side Communication—

In addition, the CommRequest abstraction may provide browser-side communication across domains (arrow 433). For example, a service instance (e.g., a service instance 322) from Site B 420 may declare a port "inc", and register a handler function to receive browser-side messages on that port:

```
function incrementFunc(req)
{
    var src = req.domain;
    var i = parseInt(req.body);
    return i+1;
}
var svr = new CommServer( );
svr.listenTo("inc", incrementFunc);
```

Another domain corresponding to Site A 410 can then address a browser-side message to Site B's port using a URL scheme local that specifies Site B's SOP domain (<scheme, DNS host, TCP port> tuple) and port name:

```
req = new CommRequest( );
req.open("INVOKE",
    "local:http://bob.com//inc", false);
req.send(7);
y = parseInt(req.responseBody);
```

In one example, local requests do not use HTTP, hence the special method INVOKE. Because the request is local, the implementation can forego marshaling objects into JSON or XML; instead, it need only validate that the sent object is data-only. As in JSONRequest, a data-only object is a raw data value, like an integer or string, or a dictionary or array of other data-only objects. The example false parameter specifies a synchronous request.

The port-based naming scheme works well for naming unique instances of services. If one service may be instantiated multiple times in a browser, however, then it may be important to be able to address a particular instance by its relationship to the caller. For example, suppose a page on both Site A and Site B include an instant-messaging gadget from im.com. Each parent page may communicate with its own im.com ServiceInstance to set default parameters or to negotiate Friv boundaries. To facilitate communication addressed from parent to child or vice versa, each service instance labeled with a unique number:

serviceInstance.getId( ) A service instance can then register this identifier as a port name.

A service instance wishing to address its parent can do so by constructing the destination's local: URL using these methods:

```
url = "local:"
    +serviceInstance.parentDomain( )
    +serviceInstance.parentId( );
```

Additionally, a service instance wishing to address its child can do so with these methods on the service instance element representing the child in the parent's DOM:

```
si = document.getElementById("IMchild");
url = "local:"
    +si.childDomain( )
    +si.getId( );
```

Previous approaches have proposed alternative cross-domain browser-side communications mechanisms. However, said mechanisms provide only parent-to-child addressing. In contrast to various aspects disclosed herein, the previously proposed mechanisms do not provide global addressing between arbitrary browser-side components. Further, the previously proposed mechanisms reveal the full Uniform Resource Identifier (URI) of the sending document rather than only the domain thereof, which may be inappropriate if the URI of the sending document contains secret information such as session identification. Further, while the previously proposed mechanisms offer a unidirectional communication model, various aspects disclosed herein provide an asynchronous procedure call consistent with the XMLHttpRequest used in currently deployed AJAX applications.

Figure 5:
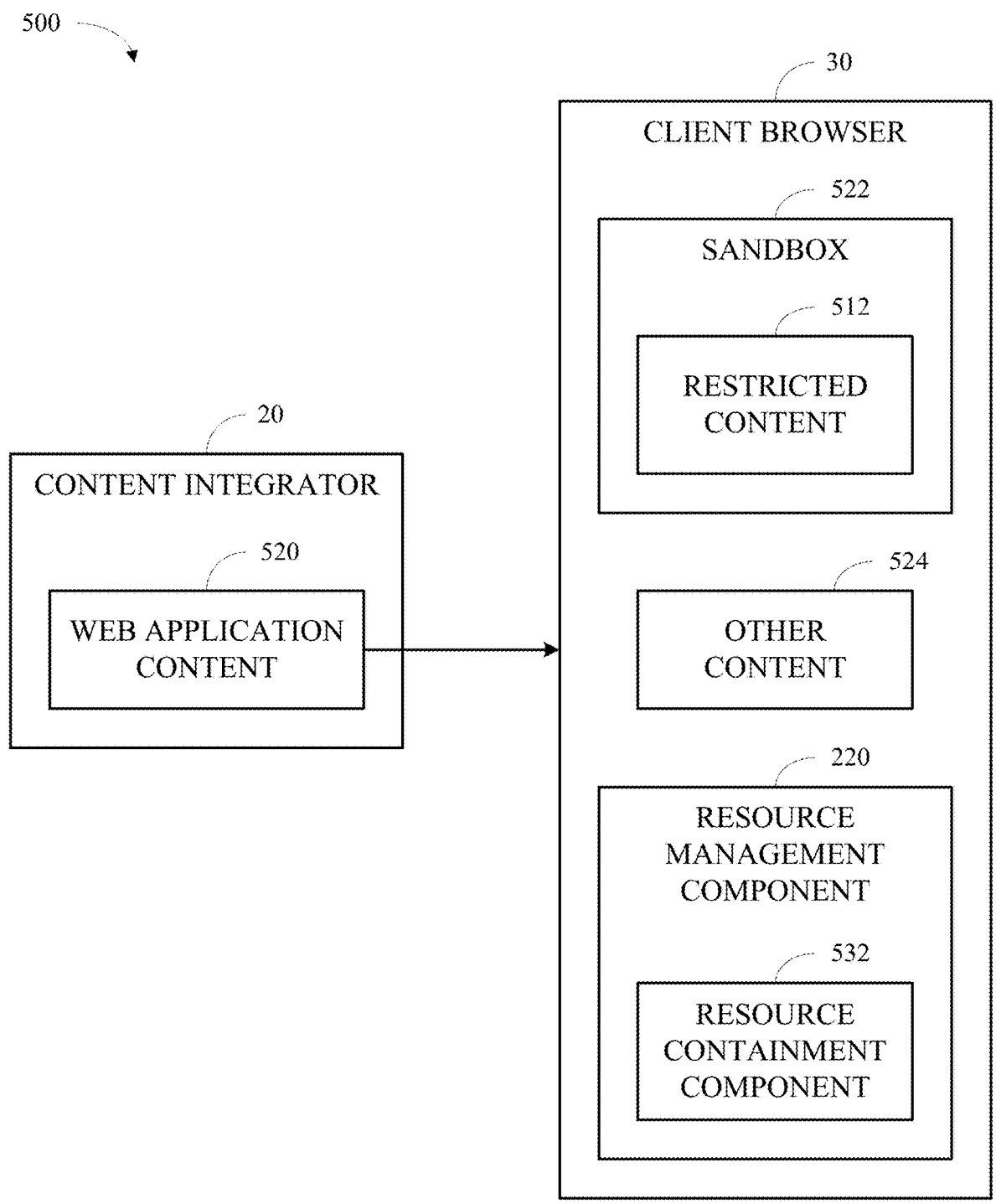
FIG. 5 is a block diagram of a system that facilitates containment of restricted content in a Web-based application in accordance with an aspect of the present invention.

Turning to FIG. 5, a block diagram of a system 500 that facilitates containment of restricted content 512 in a Web-based application in accordance with an aspect of the present invention is illustrated. As illustrated in system 500, a client browser 30 may obtain Web application content 520 from a content integrator 20 in order to carry out a Web-based application corresponding to the Web application content 520. In one example, the client browser 30 can include a resource management component 220 that can facilitate enhanced security and communication capability by the client browser 30 in a similar manner to the resource management component 220 described above with regard to system 200. The Web application content 520 provided by the content integrator 20 may in turn be obtained from one or more content providers (e.g., content providers 10). In one example, the Web application content 520 received by the client browser 30 can include restricted content 512 or otherwise untrusted content. To provide enhanced protection and mitigate adverse effects on security that may be present as a result of the restricted content 512, the resource management component 220 at the client browser 30 can include a resource containment component 532 that can implement mechanisms and/or browser abstractions for containing the restricted content 512 in a sandbox 522. In one example, the sandbox 522 can contain the restricted content 512 and prevent it from accessing any principal's resources, including any other content 524 obtained from the content integrator 20. In another example, other content 524 located at the client browser 30 can access restricted content 512 located in a sandbox 522, while the restricted content 512 contained in the sandbox 522 can be restricted from reaching outside of the sandbox 522. Thus, by placing untrusted content in a sandbox 522, untrusted content can be utilized by the client browser 30 in a Web application without the security concerns normally associated with untrusted content.

Abstraction for Asymmetric Trust—Sandbox

As noted above, when a service integrator 20 consumes a restrictive service, it has at least an asymmetric trust with the service. Another scenario of asymmetric trust is when an integrator 20 uses a provider's public library service. The integrator 20 may want to access the library freely, but deny or control the library's access to its own resources. In accordance with one aspect, a sandbox abstraction can be implemented for asymmetric trust. In one example, the sandbox abstraction can be utilized by a browser 30 via a sandbox tag:

```
<Sandbox src=' someContent'>
    Fallback if sandbox tag not supported
</Sandbox>
```

The "src" file can either be a library service from a different domain or restricted content from any domains. However, a library service from the same domain may not be allowed as the integrator to be used in the tag, since if the library were not trusted by its own domain, it should not be trusted by others either. It should also be noted that an integrator 20 should take caution to sandbox third-party libraries consistently—if a third-party library is sandboxed in one application, but not sandboxed in another application of the same domain, then the library can escape the sandbox when both applications are used.

With the sandbox abstraction, although the sandboxed content cannot reach out of a sandbox 522, the enclosing page of the sandbox 522 can access everything inside the sandbox 522 by reference. This access may include reading or writing script global objects, invoking script functions, and modifying or creating DOM elements inside the sandbox 522. However, the enclosing page may not be allowed to put its own object references, or any other references that do not belong to the sandbox 522, into the sandbox 522. This is to prevent code from within the sandbox 522 to follow those references out of the sandbox 522. For example, the enclosing page is not allowed to pass its own display elements into the sandbox 522. If an integrator 20 wants to integrate a third-party library together with some of its own content 524, such as display elements that may be needed by the library, the integrator 20 may be required to create its own restricted content that includes both the library and the display elements and then sandbox that restricted service.

In one example, sandboxes 522 can be nested. A sandbox's ancestors can access everything inside the sandbox 522, while the sandbox 522 still cannot access anything outside of it. Thus, it follows that sandbox siblings cannot access one another. Any DOM elements can be enclosed inside a sandbox 522, including service instances (e.g., service instances 322). However, a service instance declared inside a sandbox 522 does not give the service instance any additional constraints. No matter where a service instance is located in a DOM tree, it always represents a service instance of a principal, which shares with other instances of the same principal the persistent state of the principal and the remote data on its web server. Therefore, the sandbox 522 cannot access any resources that belong to its child service instances.

Sandboxes 522 may be particularly useful for creating robust client mashups out of third-party library services. For each third-party library service that a service integrator 20 uses, the integrator 20 can create a restricted service enclosing the library along with its needed display DOM elements, such as div, and put the restricted service into a sandbox 522. The integrator 20 can then access and mash up content across its sandboxes 522 as it wishes without worrying about any of the library services maliciously or recklessly tampering with the integrator's content or other resources.

Abstraction for Using Restricted Services with Controlled Trust

In a scenario such as the one described above, a service instance (e.g., a service instance 322) may be used for controlled trust with restricted services 512 where an integrator 20 also wants to control its own access to restricted services 512. When the MIME type of a service instance's content indicates restricted content, the service instance may automatically disallow its content from accessing the resources of the service instance's hosting domain including XMLHTTPRequests and cookie access, in addition to HTML DOM isolation that service instance already provides. It should be appreciated that this restricted mode of the ServiceInstance abstraction is the same as the <Module> tag, except that unlike for <Module>, a service instance is allowed to communicate using both forms of the CommRequest abstraction.

Figure 6A:
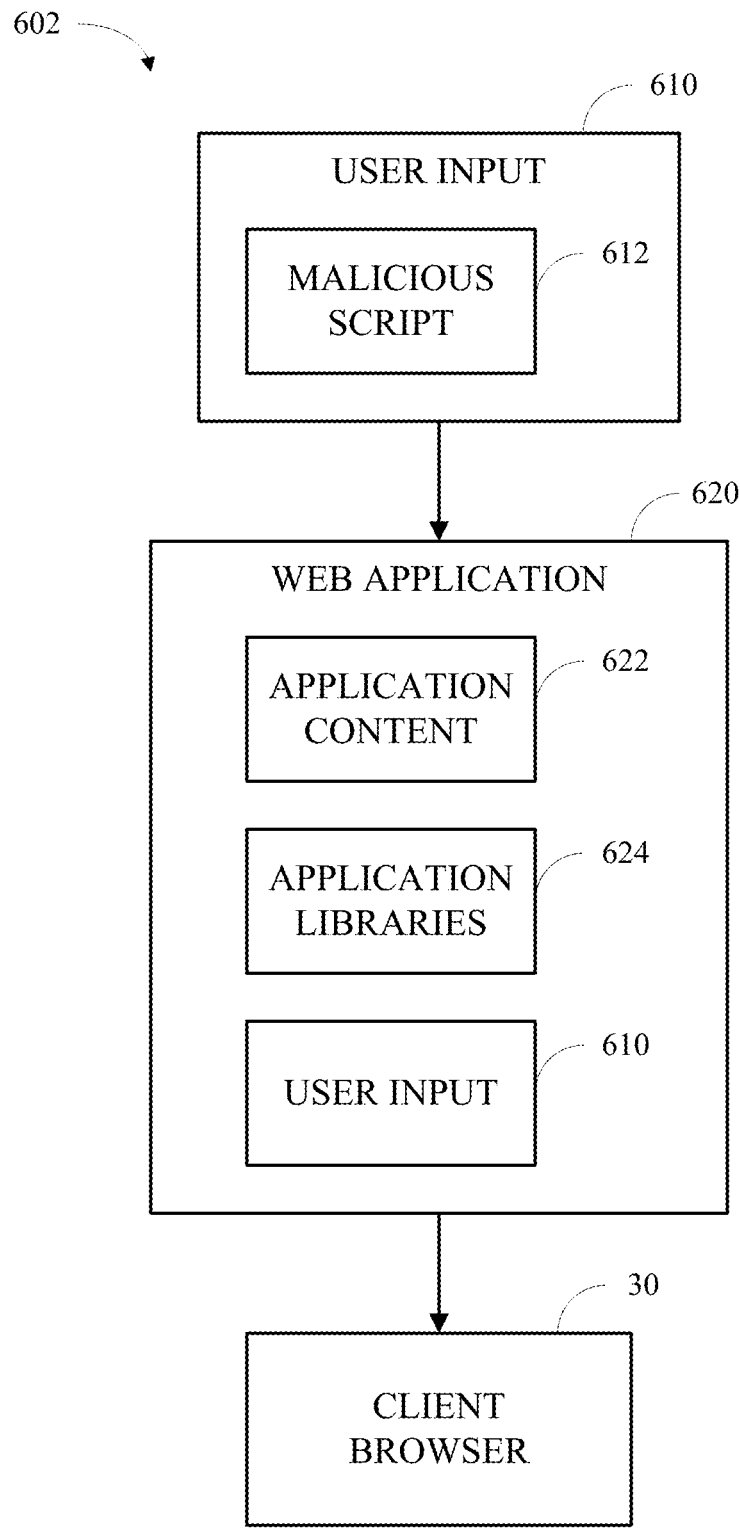
FIG. 6A is a diagram illustrating a cross-site scripting (XSS) attack on a conventional Web-based application.

Referring to FIG. 6A, a diagram 602 is provided that illustrates a cross-site scripting (XSS) attack on a Web-based application 620. As of 2006, more than 21% of vulnerabilities reported to Common Vulnerabilities and Exposures ("CVE") are Cross Site Scripting (XSS) vulnerabilities, making it the most commonly reported vulnerability. In accordance with one aspect, the ServiceInstance and Sandbox abstractions provided herein can be used to combat XSS attacks in a fundamental way while retaining or even enhancing the richness of page presentation.

Background on XSS Vulnerabilities

XSS is a type of vulnerability found in web applications 620. In XSS, an attacker often exploits the case where a web application 620 injects user input 610 into dynamically-generated pages without first filtering the input. The injected content may be either persistent or non-persistent. As an example of a persistent injection attack, an attacker may upload a maliciously-crafted profile containing a malicious script 612 to a social networking web site. The site injects the content into pages shown to others who view the profile via a client browser 30. An injected script 612 can then run alongside application content 622 and application libraries 624 from the web application 620 with the social networking site as its domain, enabling the script 612 to make requests back to the site on behalf of the user. The notorious Samy worm that plagued myspace.com exploited persistent injection, infecting over one million myspace.com user profiles within the first twenty hours of its release.

A malicious input may also be non-persistent, simply reflected through a web server. For example, suppose a search site replies to a query x with a page that says "No results found for x." An attacker can then trick a user into directing his browser 30 to a URL which contains a malicious script within the query x to the search site. The script in the reflected page from the search site may then run with the search site's privilege.

Existing Defense

The root causes of XSS vulnerabilities are unsanitized user input and unexpected script execution. Many existing mechanisms tackle the first cause by sanitizing user input 610. For applications 620 that take text-only user input 510, the sanitization is as simple as enforcing the user input 610 to be text, escaping special HTML tag symbols, such as "<", into their text form, such as "<." However, many web applications 620, such as social networking Web sites like myspace.com, demand rich user input 610 in the form of HTML. Because no conventional browser abstractions constrain the reach of an included script, these web sites typically have the policy of denying scripts in user-uploaded HTML pages. Consequently, user input sanitization involves script detection and removal. However, this turns out to be non-trivial; because browsers speak such a rich, evolving language and many browser implementations exist and vary, there are many ways of injecting a malicious script 612. In many occasions already, creative attackers have found new ways of injecting a malicious script 612. The Samy worm, for example, was notorious for discovering several holes in myspace.com's filtering mechanism.

The difficulty of exhaustive input filtering has led previous research to tackle the second root cause, preventing unexpected script execution. One previous approach proposed Browser-Enforced Embedded Policies ("BEEP") to white-list known good scripts and adding a "noexecute" attribute to <div> elements to disallow any script execution within that element. One drawback of this approach, however, is its insecure fallback mechanism when BEEP-capable pages run in legacy browsers. For example, the "noexecute" attribute may be ignored by legacy browsers, allowing scripts in the <div> element to execute.

The reason behind Web servers' policy to disallow scripts is that existing browsers provide no way to restrict a script's behavior once it is included. The best known approach to restrict the behavior of a script is to use a cross-domain iframe to isolate user-supplied scripts. However, this approach is undesirable for several reasons. First, it requires the server to serve the scripts from a second domain to associate the scripts with a distinct domain. Second, the iframe provides an inflexible display layout. Third, under such an approach, user-supplied content cannot interact, even in a constrained way, with its containing page.

Figure 6B:
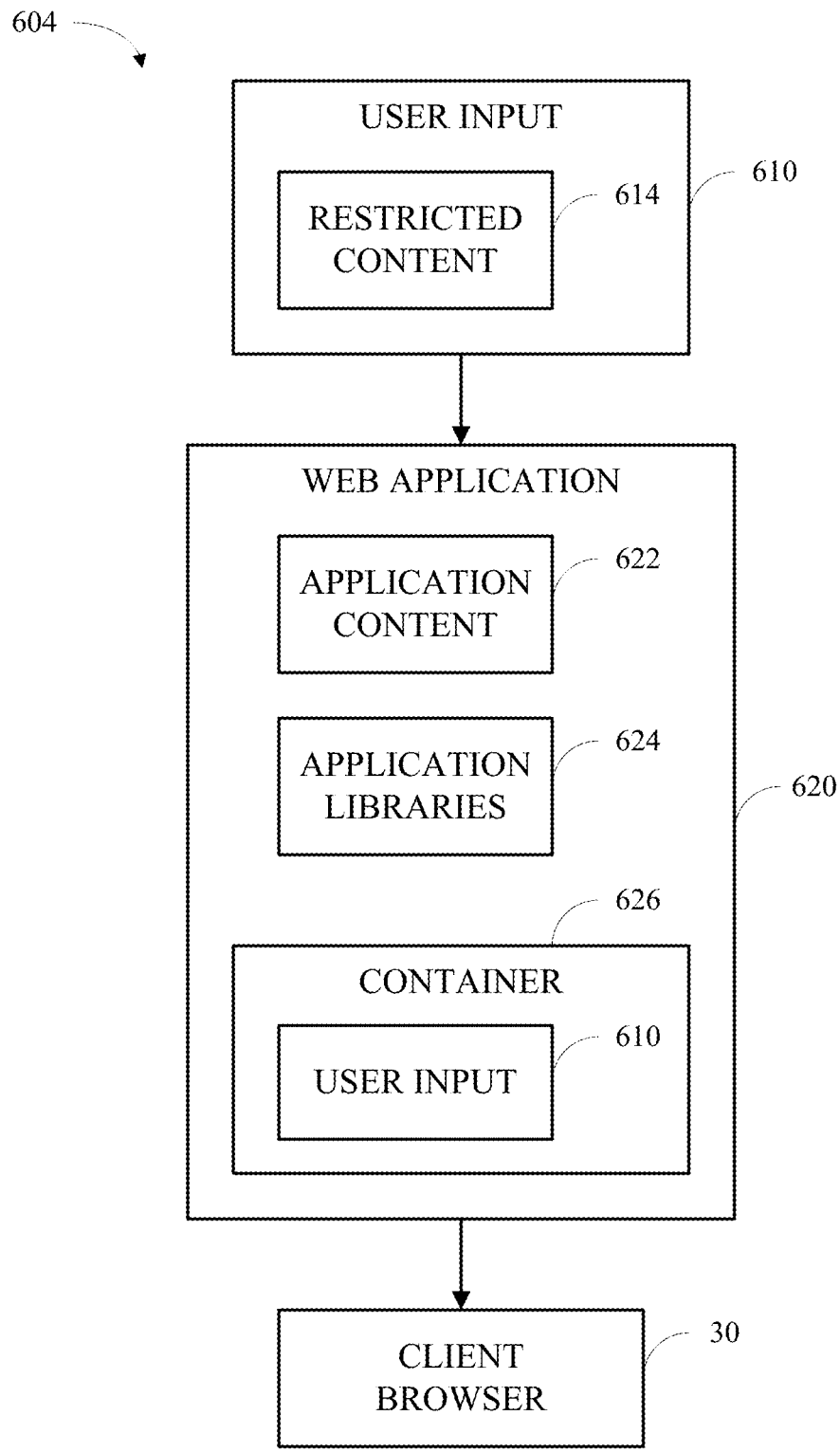
FIG. 6B is a diagram illustrating security abstractions employable by a Web-based application against a cross-site scripting (XSS) attack in accordance with an aspect of the present invention.

Turning now to FIG. 6B, a diagram 604 illustrating security abstractions employable by a Web-based application 620 against a XSS attack in accordance with an aspect of the present invention is illustrated. In accordance with one aspect, the Sandbox and/or ServiceInstance abstractions described above may be used to provide a container 626 to which user input 610, including any scripts therein, may be confined. As a result, the Sandbox and ServiceInstance abstractions can solve all of the problems with iframes and can serve as a fundamental defense against XSS while allowing third-party script-containing rich content. In accordance with another aspect, the abstraction used may depend on whether the trust model used by the web application 620 reflects asymmetric trust or controlled trust. For persistent, user-supplied HTML content, a Web server can serve said content as restricted content 614. For non-persistent user input 610 in a reflected server page, the reflected page can use a sandbox (e.g., a sandbox 522) or a service instance (e.g., a service instance 322) as a container 626 to contain the user input 610 with the "src" attribute being either a dynamic page proxied by the server:

```
<Sandbox
    src=' userInput.asp?... escaped input ...'>
</Sandbox>
``` or a "data" URI with encoded content:

```
<Sandbox
    src=' data:text/x-restricted+html,
        ... escaped user input ...'>
</Sandbox>
```

A service instance may enable flexible layout by connecting the display of the restricted content 614 to the parent container 626 with a Friv. Alternatively, a sandbox can be used, wherein the display of the DOM of the restricted content 614 is directly accessible by the parent. A service instance can communicate with its parent's client or server components using the CommRequest primitive. Likewise, a sandbox can do the same, and in addition a parent container 626 can communicate with a child sandbox by directly accessing the child's JavaScript objects.

Figure 7:
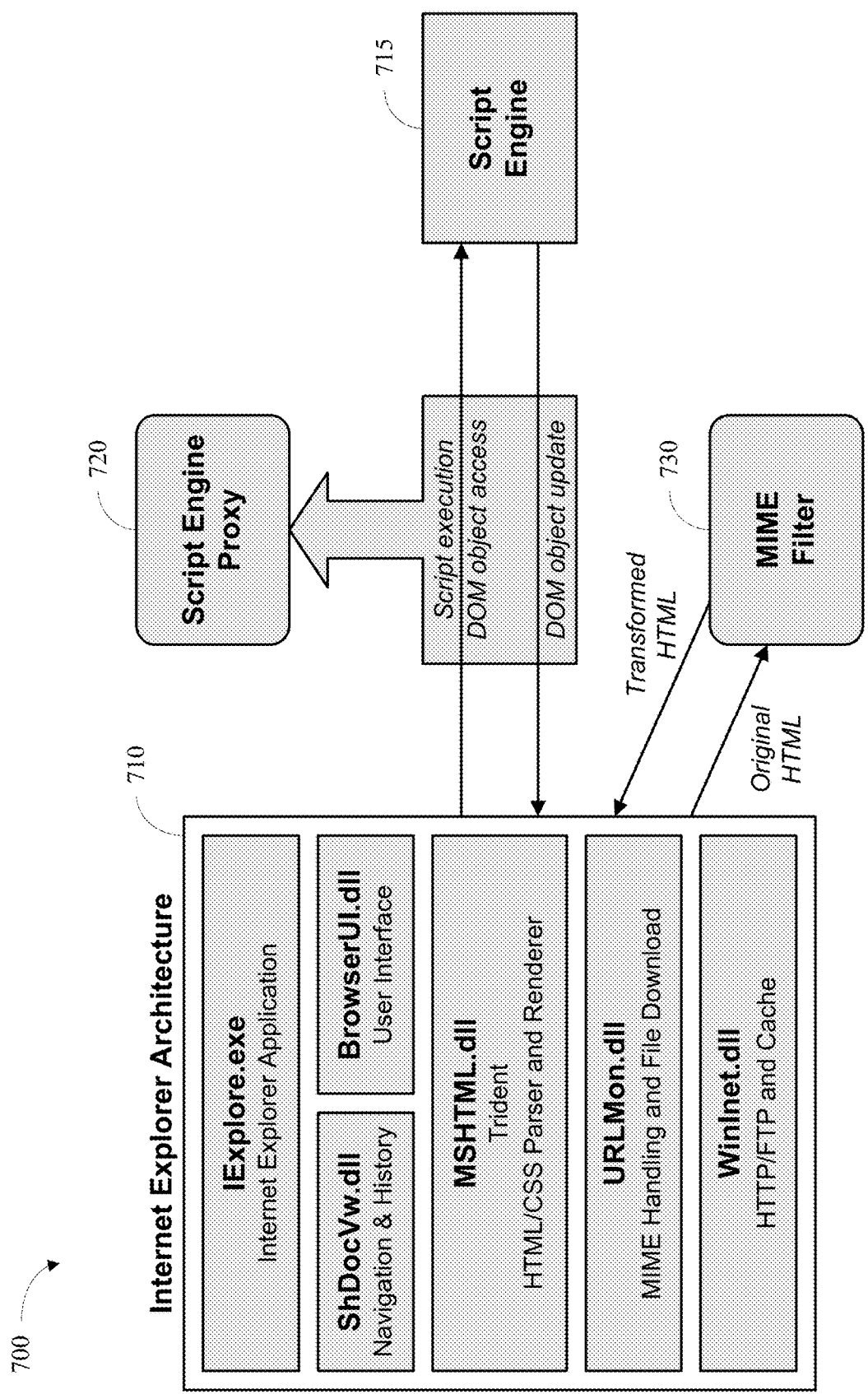
FIG. 7 illustrates an implementation of example protection and communication abstractions for a Web browser in accordance with an aspect of the present invention.

Referring to FIG. 7, a diagram is provided that illustrates an example system 700 that may implement various protection and communication abstractions for a Web browser (e.g., a client browser 30) in accordance with an aspect of the present invention. In one specific, non-limiting example, system 700 can implement all of the abstractions described herein and their properties except the feature of decoupling display from ServiceInstance. The implementation requires one Friv per service instance, which may contain child Frivs or frames. The system is based on the Internet Explorer 7 (IE) architecture 710 and runs on both Windows XP SP2 and Windows 2003 SP1. Additionally, it should be appreciated that the system 700 and techniques applied therewith can also be applied to other browsers.

In one example, instead of modifying IE's source code directly, the system 700 can leverage browser extensions and public interfaces exported by IE. Additionally, it can be seen that the system 700 includes two extensions to the IE architecture 710. The first extension is a script engine proxy (SEP) 720 built from scratch using public interfaces exported by IE. As in all browsers, IE includes an HTML/CSS rendering and layout engine and various script engines including a JavaScript engine and a VBScript engine. When a script element is encountered during HTML rendering, the script element is handed to a corresponding script engine 715 for parsing and execution. Script execution may manipulate HTML DOM objects. For this purpose, the script engine 715 asks the rendering page for references to needed DOM objects. In accordance with one aspect, the SEP 720 interposes between the rendering engine and the script engines and mediates and customizes DOM object interactions. To the rendering engine of a browser, a SEP 720 serves as a script engine and exports the interface of a script engine. To the original script engine 715 of the browser, the SEP 720 serves as a rendering engine and exports the DOM interface of the rendering engine. In one example, object wrappers are used for the purpose of interposition. When a script engine 715 asks for a DOM object from the rendering engine, a SEP 720 intercepts the request, retrieves the corresponding DOM object, associates the DOM object with its wrapper object inside the SEP 720, and then passes the wrapper object back to the original script engine 715. From that point on, any invocation of the wrapper object methods from the original script engine may go through the SEP 720. In IE, a SEP 720 may take the form of a COM object and may be registered in Windows Registry associated with a scripting language (such as JScript) to serve as IE's script engine for that language. While various examples herein have focused on the JavaScript language, which is dominant in current Web applications, the techniques and browser abstractions described herein can also be readily applied to other types of languages.

In one example, the SEP 720 can take the role of implementing various protection abstractions described herein. To that end, the existing isolation mechanism, namely cross-domain frames, may be used as a building block. A ServiceInstance element may be implemented using a cross-domain frame with at least one script in it such that the SEP's interposition can be triggered on the frame. Additionally, ServiceInstances from the same domain may be segregated as cross-domain frames, though they may be allowed to access the same set of cookies. In another example, a sandbox element may also be implemented using a frame. Accessing from the outside to the inside of the frame mimics that of same-domain frames, while accessing from the inside to the outside of the frame mimics that of cross-domain frames. Each object access from within a sandbox may be further mediated to ensure that the object belongs to the sandbox and not a reference from the outside of the sandbox. The customized access control of cross-domain frames for realizing the abstractions described herein may also be realized via object wrappers as described above.

The second extension is a MIME filter 730, which can serve as an asynchronous pluggable protocol handler at the software layer of URLMon.dll where various content (i.e., MIME) types are handled. The MIME filter 730 may take an input HTML stream and output a transformed HTML stream to the next software layer in IE. In one example, the MIME filter 730 is used to translate new tags into existing tags, such as iframe and script. Further, special JavaScript comments inside an empty script element may be used to indicate the original tags and attributes to the SEP 720. For example,

```
<sandbox src=' restricted.rhtml'
    name=' s1'>
</sandbox>
``` may be translated by the MIME filter 730 to

```
<script>
<!--
/**
<sandbox src=' restricted.rhtml'
    name=' s1'>
**/
-->
</script>
<iframe src=' restricted.rhtml'
    name=' s1'>
</iframe>
```

The comments inside the script element inform the SEP 720 that the iframe with name "untrustedSandbox" should be treated as a sandbox. In one example, a similar translation can occur with respect to service instances.

In accordance with one aspect, CommRequest-based communication primitives may be implemented by providing two runtime objects CommServer and CommRequest in conjunction with one or more communication methods described above. For access control on XMLHTTPRequest, particularly for restricted mode ServiceInstances and Sandboxes, the above object wrapper mechanism can again be used for interception. In accordance with another aspect, Friv may be implemented using iframe as well. CommRequest can be used to carry out the automatic negotiation on the frame width and height between a Friv and its parent.

As can be observed from the above discussion with regard to system 700, script engine proxies can serve as a great platform for experimenting with new browser features. The fact that the above-mentioned abstractions could be implemented on the platform illustrated by system 700 along with the MIME filter 730 indicates that they should also be readily implementable in existing browsers.

Figure 8:
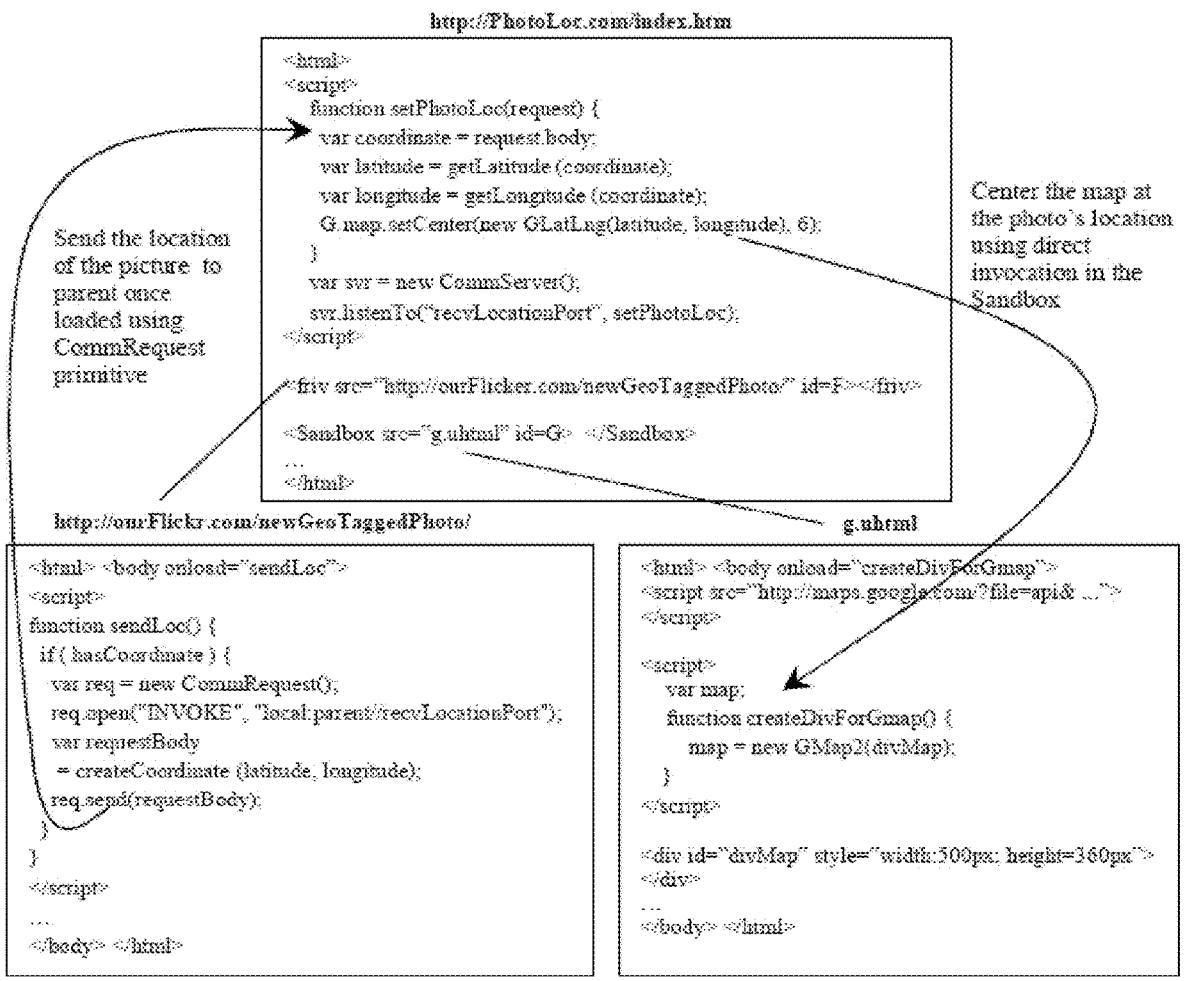
FIG. 8 illustrates an example Web application that employs protection and communication abstractions in accordance with an aspect of the present invention.

Referring now to FIG. 8, an example Web application 800 is illustrated that employs protection and communication abstractions in accordance with an aspect of the present invention. Specifically, Web application 800 is a photo location web service called PhotoLoc, which mashes up Google's map service and Flickr's geo-tagged photo gallery service so that a user can map out the locations of photographs taken. Flickr provides API libraries in languages like Java or C# to interact with the Flickr Web server across the network, for example, to retrieve geo-tagged photographs. To facilitate easy, browser-side cross-domain communication, PhotoLoc utilizes an access-controlled, Flickr-based service that can be accessed using the Friv abstraction for isolation and communication. Since, as noted previously, controlled trust may be required for an access-controlled service, PhotoLoc and Flickr must communicate with each other through CommRequest. Google's map service is a public library utility service. PhotoLoc may choose an asymmetric trust relationship with Google's map library, i.e., it may trust itself to use the library but may not trust the library to access PhotoLoc's resources. In one example, PhotoLoc puts Google's map library along with the Div display element that the library needs into "g.uhtml" and serves "g.uhtml" as restricted content (e.g., restricted content 512). PhotoLoc's main service page (e.g., index.htm) can then use a sandbox (e.g., a sandbox 522) to contain "g.uhtml." Thus, PhotoLoc can access everything inside the sandbox, but Google's map library cannot reach out of the sandbox.

Turning to FIGS. 9-12, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various embodiments. As will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, etc.). Such components can automate certain mechanisms or processes performed thereby to make portions of the systems and methods more adaptive as well as efficient and intelligent.

Figure 9:
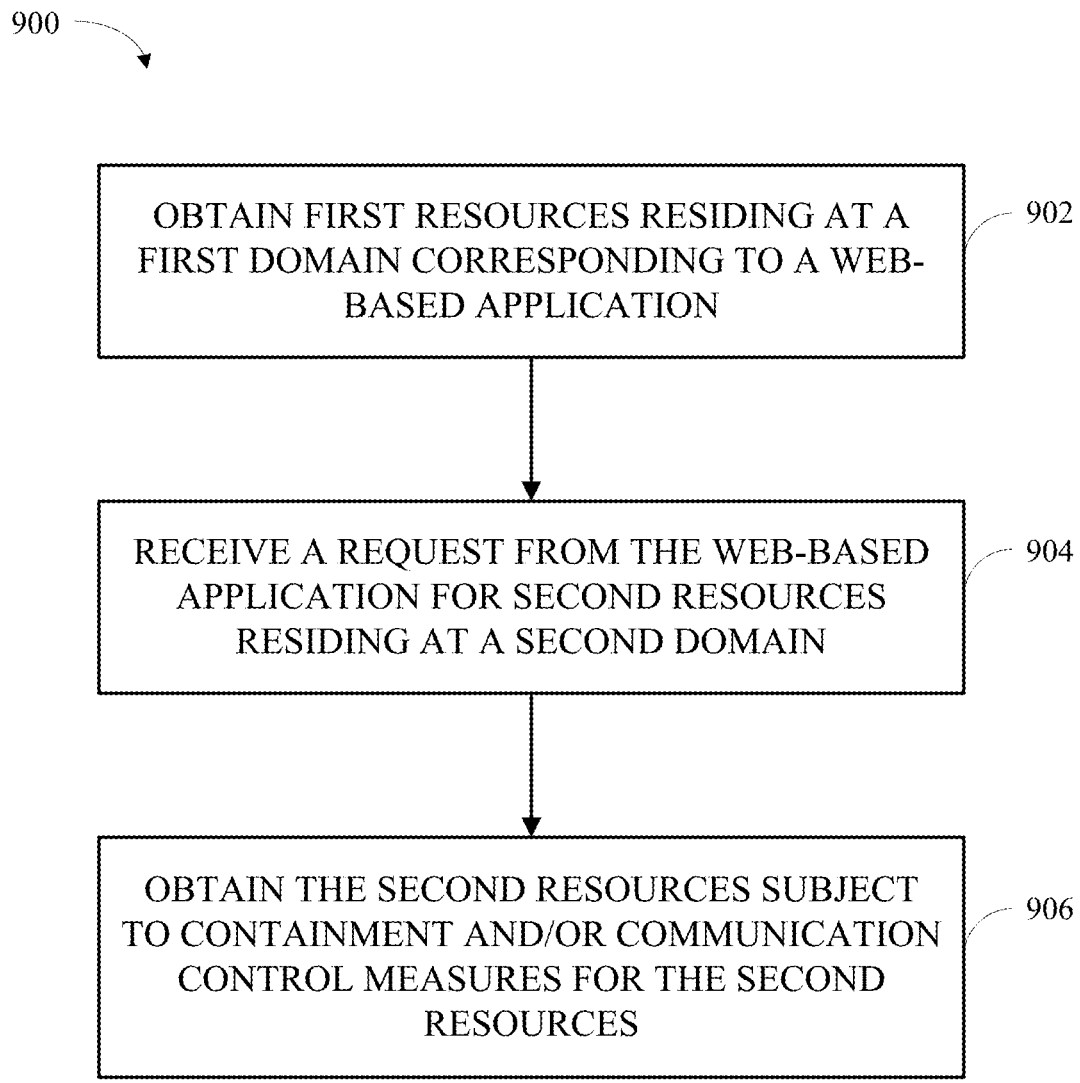
FIG. 9 is a flowchart of a method of providing enhanced security and communication capability for a Web-based application in accordance with an aspect of the present invention.

Referring to FIG. 9, a flowchart of a method 900 of providing enhanced security and communication capability for a Web-based application in accordance with an aspect of the present invention is illustrated. At 902, first resources are obtained from a first domain (e.g., by a client browser 30) corresponding to a Web-based application (e.g., a Web-based application provided by a content integrator 20). At 904, a request is received from the Web-based application for second resources at a second domain. At 906, the second resources are obtained subject to containment and/or control measures for the second resources.

Figure 10:
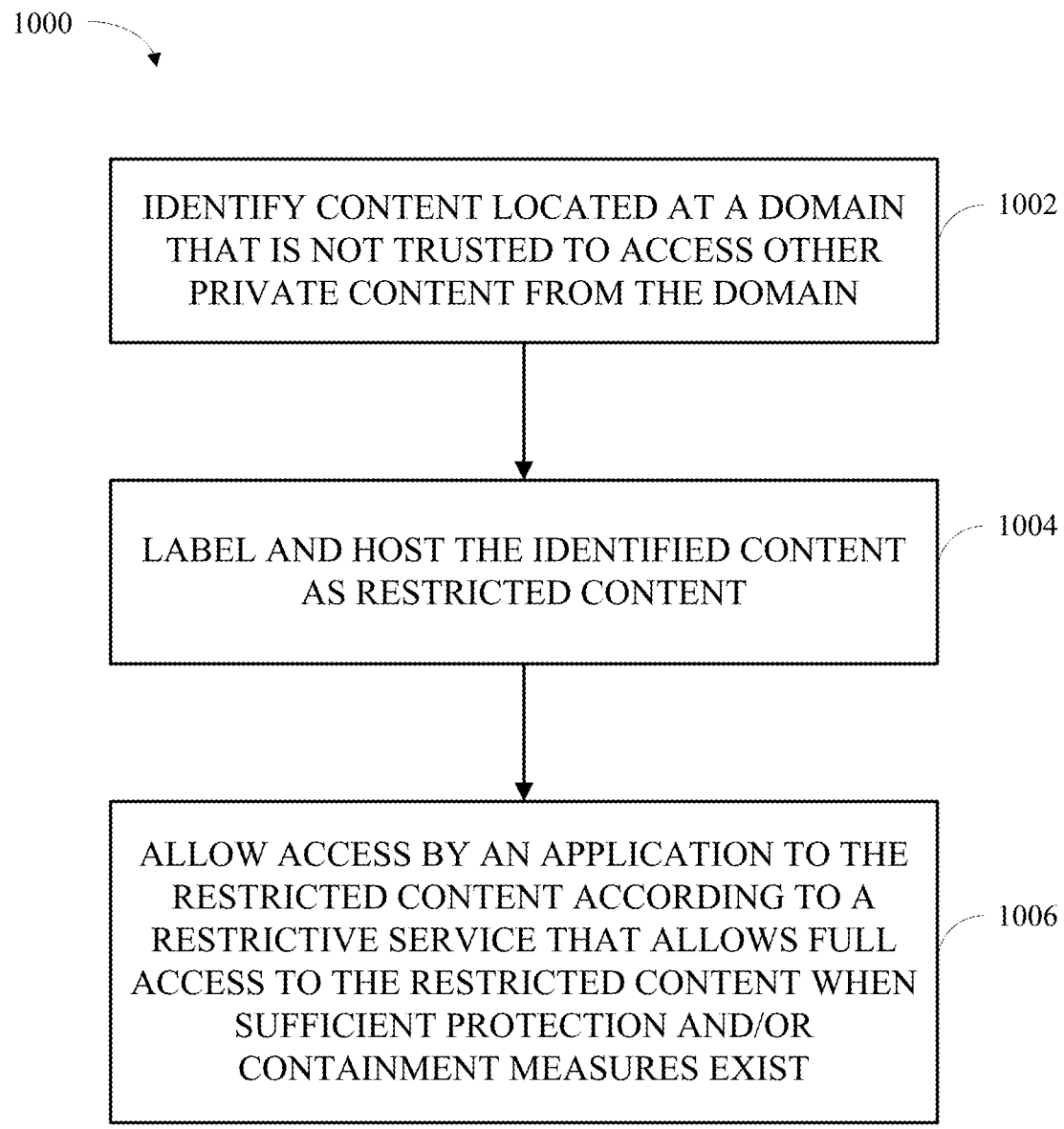
FIG. 10 is a flowchart of a method of restricting access to data by Web-based applications in accordance with an aspect of the present invention.

Referring now to FIG. 10, a flowchart of a method 1000 of restricting access to data by Web-based applications in accordance with an aspect of the present invention is illustrated. At 1002, content located at a domain that is not trusted to access other private content from the domain is identified (e.g., by a content provider 10 or a content integrator 20). At 1004, the identified content is labeled and hosted as restricted content (e.g., restricted content 210). At 1006, access to the restricted content by a Web-based application is allowed according to a restrictive service that allows full access to the restricted content when sufficient protection and/or containment measures exist.

Figure 11:
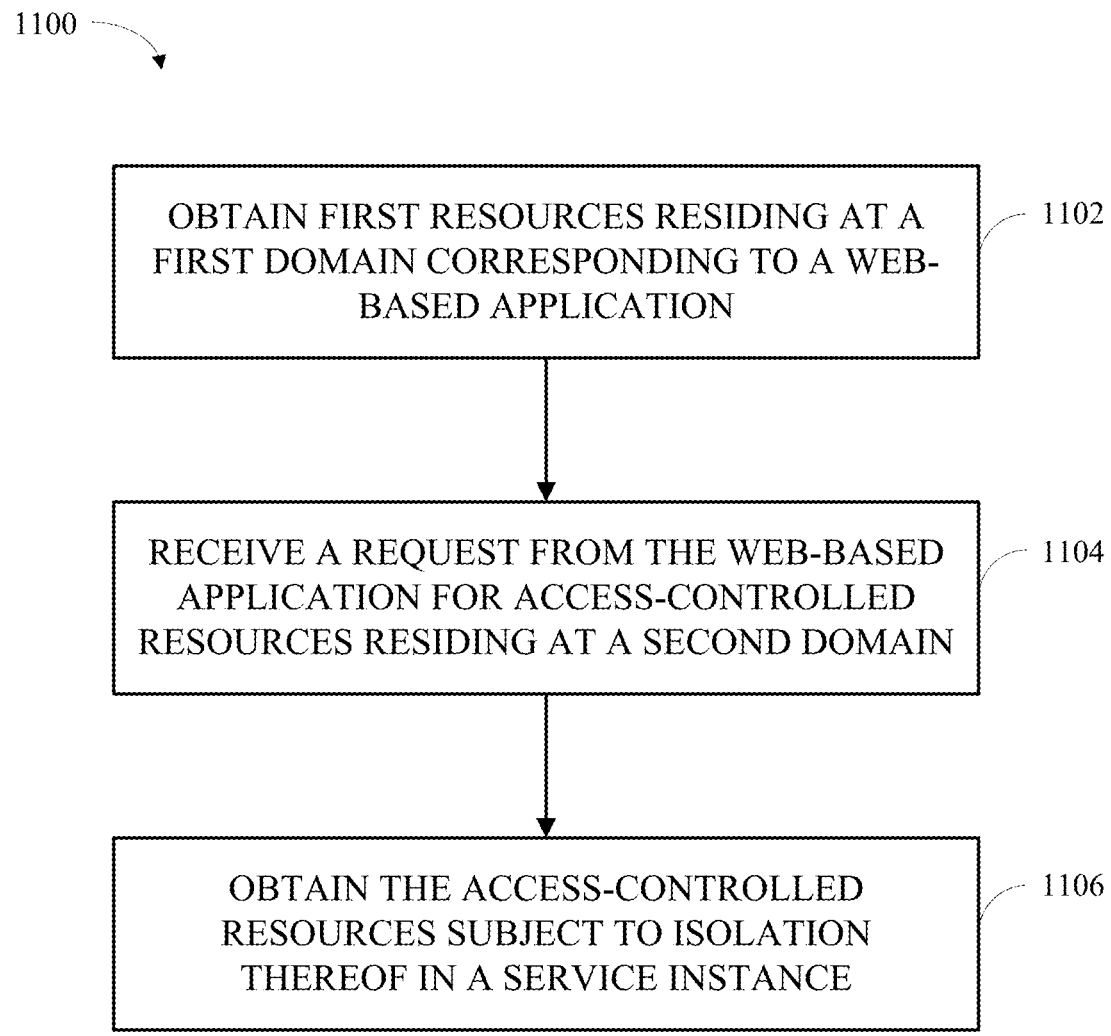
FIG. 11 is a flowchart of a method of initiating controlled communication with access-controlled resources in a Web-based application in accordance with an aspect of the present invention.

Turning to FIG. 11, a flowchart of a method 1100 of initiating controlled communication with access-controlled resources (e.g., access-controlled content 312) in a Web-based application in accordance with an aspect of the present invention is illustrated. At 1102, first resources are obtained from a first domain (e.g., by a client browser 30) corresponding to a Web-based application (e.g., a Web-based application provided by a content integrator 20). At 1104, a request is received from the Web-based application for access-controlled resources (e.g., access-controlled content 312) at a second domain. At 1106, the access-controlled resources are obtained subject to isolation thereof in a service instance (e.g., a service instance 322).

Figure 12:
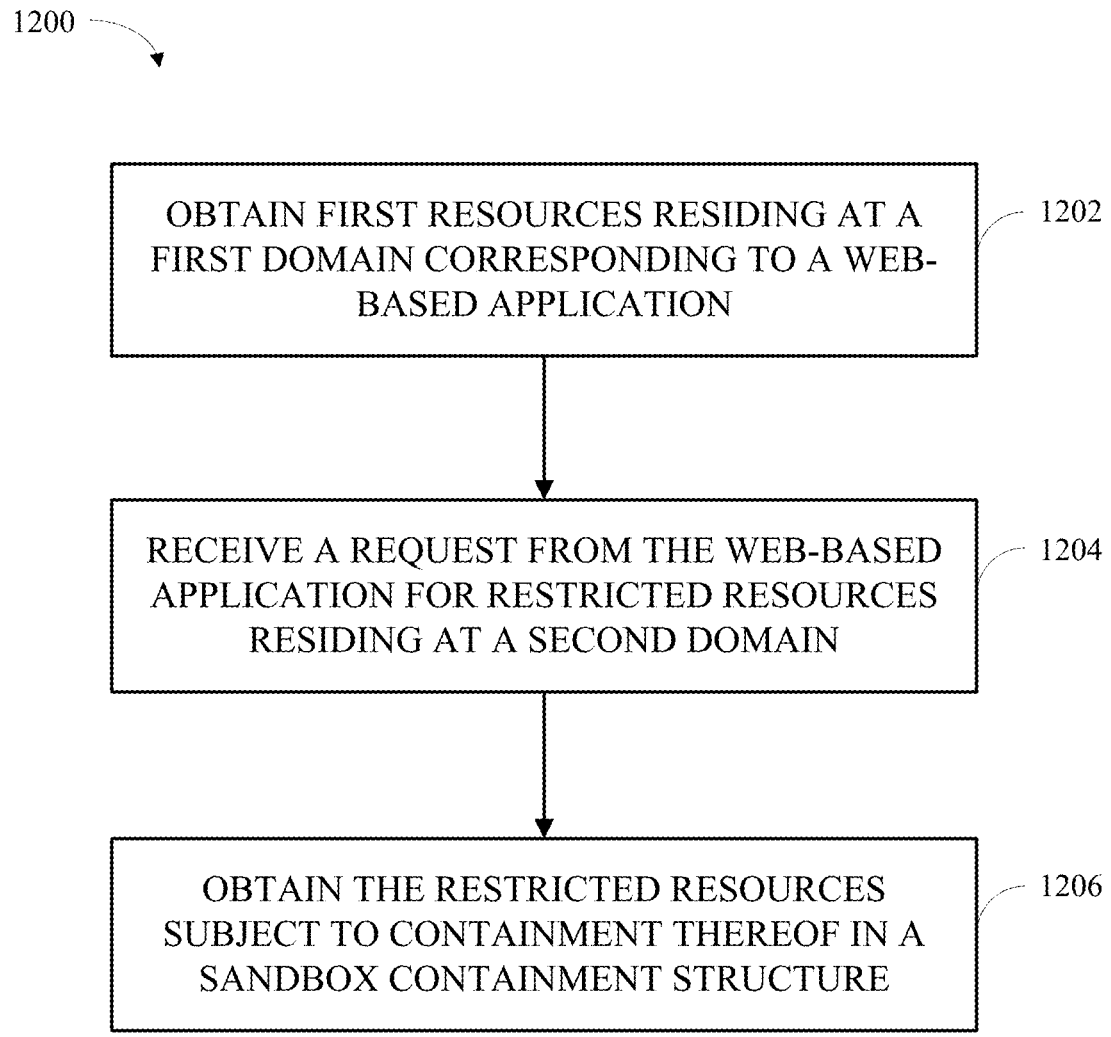
FIG. 12 is a flowchart of a method of containing restricted content in a Web-based application in accordance with an aspect of the present invention.

Referring to FIG. 12, a flowchart of a method 1200 of containing restricted content (e.g., restricted content 512) in a Web-based application in accordance with an aspect of the present invention is illustrated. At 1202, first resources are obtained from a first domain (e.g., by a client browser 30) corresponding to a Web-based application (e.g., a Web-based application provided by a content integrator 20). At 1204, a request is received from the Web-based application for restricted resources (e.g., restricted content 512) at a second domain. At 1206, the restricted resources are obtained subject to containment thereof in a sandbox containment structure (e.g., a sandbox 522).

Figure 13:
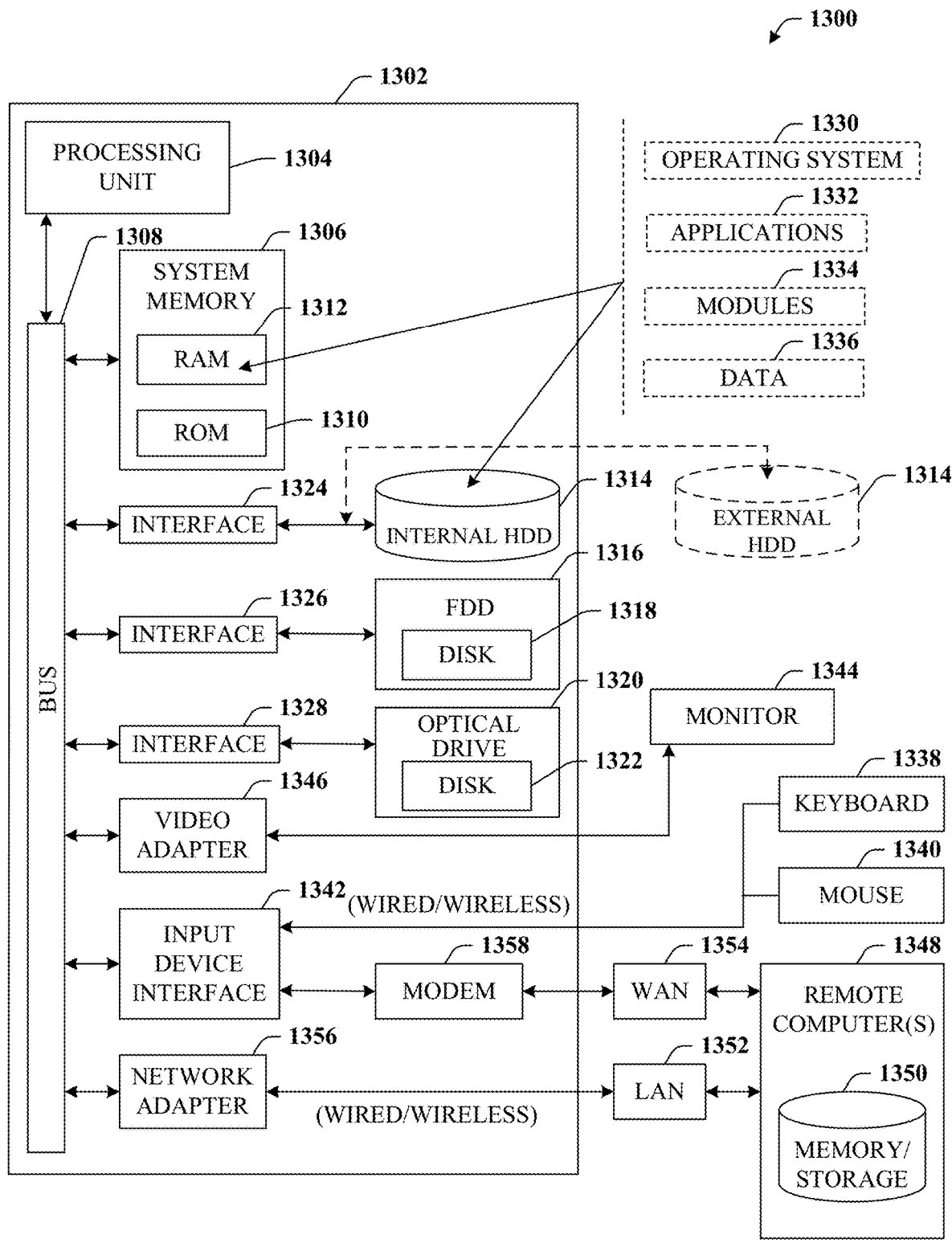
FIG. 13 is a block diagram of an example operating environment in which the present invention may function.

In order to provide additional context for various aspects of the subject invention, FIG. 13 and the following discussion are intended to provide a brief, general description of a suitable computing environment 1300 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example computing environment 1300 includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA) that may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE-1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It should be appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, a serial port, an IEEE-1394 port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, telephone, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

Figure 14:
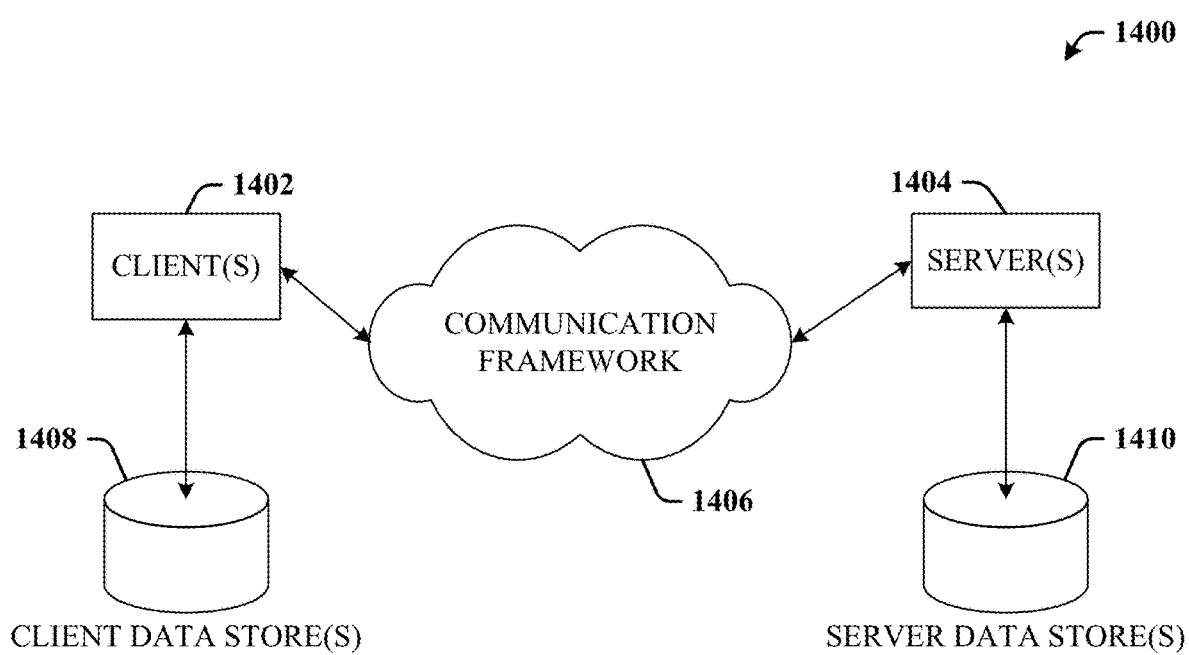
FIG. 14 is a block diagram of an example networked computing environment in which the present invention may function.

Referring now to FIG. 14, a block diagram of an example networked computing environment in which the present invention may function is illustrated. The system 1400 includes one or more client(s) 1402. The client(s) 1402 can be hardware and/or software (e.g., threads, processes, computing devices). The system 1400 also includes one or more server(s) 1404. The server(s) 1404 can also be hardware and/or software (e.g., threads, processes, computing devices). One possible communication between a client 1402 and a server 1404 can be in the form of a data packet adapted to be transmitted between two or more computer processes. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402. Similarly, the server(s) 1404 are operatively connected to one or more server data store(s) 1410 that can be employed to store information local to the servers 1404.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Furthermore, the aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A system comprising at least one processor coupled to a non-transitory computer-readable storage medium storing instructions executable by the at least one processor to implement:
    a browser configured to access first content from a first server associated with a first site and access second content from a second server associated with a second site different from the first site; and
    at least one browser-side management component configured to contain the first content from the first server associated with the first site in a first sandbox and the second content from the second server associated with the second site in a second sandbox to prevent both: (1) the first content from the first server associated with the first site from directly accessing the second content from the second server associated with the second site and (2) the second content from the second server associated with the second site from directly accessing the first content from the first server associated with the first site, and yet allow the first content from the first server associated with the first site to communicate with the second content from the second server associated with the second site using a browser-side messaging function.

2. The system of claim 1, wherein each of the first sandbox and the second sandbox is implemented using a resource containment functionality provided by the browser.

3. The system of claim 1, wherein a first service instance associated with the first site is configured to provide a first port for receiving messages via the browser-side messaging function.

4. The system of claim 2, wherein a second service instance associated with the second site is configured to provide a second port for receiving messages via the browser-side messaging function.

5. The system of claim 1, wherein the browser is configured to display both the first content from the first server associated with the first site and the second content from the second server associated with the second site as part of a web application.

6. The system of claim 1, wherein the resource management component is further configured to provide a third sandbox for a third content, wherein the third sandbox is nested within the second sandbox.

7. The system of claim 1, wherein the first content from the first server associated with the first site further comprises untrusted user input, and wherein the resource management component is further configured to contain the untrusted user input in the sandbox.

8. A method implemented by at least one processor the method comprising:
- using a browser accessing a first content from a first server associated with a first site and accessing a second content from a second server associated with a second site different from the first site; and
- at the browser, using at least one browser-side management component containing the first content from the first server associated with the first site in a first sandbox and the second content from the second server associated with the second site in a second sandbox to prevent both: (1) the first content from the first server associated with the first site from directly accessing the second content from the second server associated with the second site and (2) the second content from the second server associated with the second site from directly accessing the first content from the first server associated with the first site, and yet allowing the first content from the first server associated with the first site to communicate with the second content from the second server associated with the second site using a browser-side messaging function.

9. The method of claim 8, wherein each of the first sandbox and the second sandbox is implemented using a resource containment functionality provided by the browser.

10. The method of claim 8, wherein a first service instance associated with the first site is configured to provide a first port for receiving messages via the browser-side messaging function.

11. The method of claim 10, wherein a second service instance associated with the second site is configured to provide a second port for receiving messages via the browser-side messaging function.

12. The method of claim 8 further comprising using the browser displaying both the first content from the first server associated with the first site and the second content from the second server associated with the second site as part of a web application.

13. The method of claim 8, wherein the resource management component is further configured to provide a third sandbox for a third content, wherein the third sandbox is nested within the second sandbox.

14. The method of claim 8, wherein the first content from the first server associated with the first site further comprises untrusted user input, and wherein the resource management component is further configured to contain the untrusted user input in the sandbox.

15. A non-transitory computer-readable medium storing instructions executable by at least one processor, the method comprising:
- using a browser accessing a first content from a first server associated with a first site and accessing a second content from a second server associated with a second site different from the first site; and
- at the browser, using at least one browser-side management component containing the first content from the first server associated with the first site in a first sandbox and the second content from the second server associated with the second site in a second sandbox to prevent both: (1) the first content from the first server associated with the first site from directly accessing the second content from the second server associated with the second site and (2) the second content from the second server associated with the second site from directly accessing the first content from the first server associated with the first site, and yet allowing the first content from the first server associated with the first site to communicate with the second content from the second server associated with the second site using a browser-side messaging function.

16. The non-transitory computer-readable medium of claim 15, wherein each of the first sandbox and the second sandbox is implemented using a resource containment functionality provided by the browser.

17. The non-transitory computer-readable medium of claim 15, wherein a first service instance associated with the first site is configured to provide a first port for receiving messages via the browser-side messaging function.

18. The non-transitory computer-readable medium of claim 17, wherein a second service instance associated with the second site is configured to provide a second port for receiving messages via the browser-side messaging function.

19. The non-transitory computer-readable medium of claim 15, wherein the method further comprising using the browser displaying both the first content from the first server associated with the first site and the second content from the second server associated with the second site as part of a web application.

20. The non-transitory computer-readable medium of claim 15, wherein the resource management component is further configured to provide a third sandbox for a third content, wherein the third sandbox is nested within the second sandbox.

* * * * *